(12) United States Patent
Brooking et al.

(10) Patent No.: US 7,313,613 B1
(45) Date of Patent: Dec. 25, 2007

(54) SYSTEM AND METHOD FACILITATING NETWORK DIAGNOSTICS AND SELF-HEALING

(75) Inventors: Arthur W. Brooking, Redmond, WA (US); Dennis H. Harding, Bothell, WA (US); James J. McNelis, Carnation, WA (US); William O. Zitek, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 969 days.

(21) Appl. No.: 10/038,246

(22) Filed: Jan. 3, 2002

(51) Int. Cl.
G06F 15/173 (2006.01)

(52) U.S. Cl. .................. 709/223; 709/224; 709/220

(58) Field of Classification Search .............. 709/224, 709/220, 223
See application file for complete search history.

(56) References Cited

U.S. PATENT DOCUMENTS

| | | | | |
|---|---|---|---|---|
| 5,202,985 A * | 4/1993 | Goyal | ............................ | 707/4 |
| 5,353,412 A * | 10/1994 | Douglas et al. | .............. | 709/243 |
| 5,442,170 A * | 8/1995 | Kreft et al. | .................. | 250/229 |
| 5,650,994 A * | 7/1997 | Daley | ........................... | 370/259 |
| 5,678,002 A | 10/1997 | Fawcett et al. | | |
| 6,304,900 B1 | 10/2001 | Cromer et al. | | |
| 6,357,017 B1 * | 3/2002 | Bereiter et al. | ................ | 714/27 |
| 6,360,268 B1 * | 3/2002 | Silva et al. | ................... | 709/227 |
| 6,384,938 B1 * | 5/2002 | Numata | ....................... | 358/406 |
| 6,418,469 B1 * | 7/2002 | Justice et al. | ............... | 709/224 |
| 6,460,070 B1 | 10/2002 | Turek et al. | | |
| 6,487,208 B1 | 11/2002 | Chirashnya et al. | | |
| 6,502,130 B1 | 12/2002 | Keeler et al. | | |
| 6,529,954 B1 * | 3/2003 | Cookmeyer et al. | ......... | 709/224 |
| 6,553,515 B1 * | 4/2003 | Gross et al. | ................... | 714/47 |
| 6,781,513 B1 * | 8/2004 | Korkosz et al. | .......... | 340/539.1 |
| 6,957,348 B1 * | 10/2005 | Flowers et al. | ................ | 726/23 |
| 2001/0025323 A1 * | 9/2001 | Sodergren | .................... | 709/251 |
| 2001/0039573 A1 * | 11/2001 | Collin et al. | ................. | 709/220 |
| 2002/0144187 A1 * | 10/2002 | Morgan et al. | ................ | 714/43 |
| 2003/0081125 A1 * | 5/2003 | Sheldon et al. | ............. | 348/180 |

OTHER PUBLICATIONS

Terry L. Janssen; "Network Expert Diagnostic System for Real-time Control", Jun. 1989, pp. 207-216.
C. J. May, et al.; "Towards a Self-healing Intelligent Network", 1991, pp. 0655-0659.
Xuehong Gan; "Self-healing ATM networks", IEEE Potentials, Oct./Nov. 2000, pp. 23-25, vol. 19.
*Protocol Directory*; http://www.protocols.com/pbook/tcpip.htm, Last Viewed Oct. 30, 2001, p. 1-13.

* cited by examiner

*Primary Examiner*—Bunjob Jaroenchonwanit
*Assistant Examiner*—Lan-Dai T Truong
(74) *Attorney, Agent, or Firm*—Amin, Turocy & Calvin, LLP

(57) ABSTRACT

A system and method facilitating network diagnostics and self-healing is provided. The invention includes a data stream monitor component adapted to selectively copy protocol specific subset(s) of raw network data and provide the subset(s) of data to a diagnostics engine. The invention further includes a diagnostic engine adapted to facilitate network diagnostics and/or self-healing.

The invention further provides for protocol state compressor(s) to analyze the protocol specific subset(s) of data to abstract and/or analyze relevant information about the specific protocol without having to strictly process the protocol or preserve protocol state variable(s) in order to analyze the state of the specific protocol. Based upon this analysis, the protocol state compressor(s) can generate event(s) for undesirable state(s) (e.g., error(s) and/or failure(s)) and/or congested state(s) for use by the event correlator/inference engine. Additionally, the protocol state compressor(s) can provide information to the event correlator/inference engine regarding the state of the specific protocol (e.g., success(es)).

16 Claims, 17 Drawing Sheets

SYSTEM AND METHOD FACILITATING NETWORK DIAGNOSTICS AND SELF-HEALING

TECHNICAL FIELD

The present invention relates generally to computer systems, and more particularly to a system and method facilitating network diagnostics and self-healing.

BACKGROUND OF THE INVENTION

Computer networks have become an integral and pervasive part of business, government, and other organizations. As a result, the number of computer users has grown as well as the scale and complexity of the networks that support them. More importantly, increased network complexity causes, among other things, the number and complexity of problems associated with the network to increase.

Typical network goals such as predictable response, dependable throughput and high system availability can be frustrated by different network troubles such as physical problems, connectivity problems, and configuration problems. Moreover, users of such networks can become frustrated when they are unable to connect properly to their network and cannot make sense of error message(s) that can provide information that is minimal and cryptic. For example, a single user error message such as "The network path was not found" can be associated with a plurality of network connectivity issues.

Traditional solutions to network troubles (e.g., network connectivity problems) involve telephone-based services, for example, call centers, intelligent voice response devices (IVR) and technician-based service(s) such as on site help desks and human network experts. In addition, self-help support pages may be provided on-line containing the questions and answers to the most frequent problems. Further, conventional self-diagnostic tools are difficult for novice users to use and understand.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to a system and method facilitating network diagnostics and self-healing. More particularly, the present invention relates to an ability to diagnose and/or self-heal network connectivity problem(s).

In accordance with an aspect of the present invention, a protocol diagnostic system having a data stream monitor component and a diagnostics engine is provided. The data stream monitor component selectively copies subset(s) of raw network data and provides the subset(s) of data to the diagnostics engine. The diagnostics engine includes protocol state compressor(s) adapted to analyze the subset(s) of data based at least in part upon protocol specific information. The data stream monitor component can select subset(s) of raw network data to copy based upon lexical rule set(s) providing protocol specific information (e.g., which subset(s) to copy and/or an amount of the raw network data to copy).

Based at least in part upon analysis of the protocol state compressor(s), the diagnostics engine can determine the condition of network connectivity. Further, the diagnostics engine can store historical information regarding the condition of network connectivity. Additionally, based at least in part upon analysis of the protocol state compressor(s), the diagnostics engine can detect problem(s) and attempt to diagnose potential source(s) of the problem(s). Further, the diagnostics engine can initiate corrective action(s) and/or output diagnostic information (e.g., to a user). The diagnostics engine can adaptively add and/or remove protocol state compressor(s).

Another aspect of the present invention provides for a protocol diagnostics system to include a data stream monitor/multiplex component, a data stream distribution engine and a diagnostics engine. The diagnostics engine includes protocol state compressor(s) and an event correlator/inference engine.

The data stream monitor/multiplex component accesses (e.g., monitors) real-time network data, selectively copies protocol specific subset(s) of the real-time network data and multiplexes the subset(s) of data. Copying of the subset(s) of data can be based on information associated with lexical rule set(s).

The data stream distribution engine demultiplexes the multiplexed data subset(s) and pass them to corresponding protocol state compressor(s). Further the data stream distribution engine can receive information (e.g., lexical rule set(s)) regarding specific protocol(s) to be monitored from the diagnostics engine and/or the protocol state compressor(s). Optionally, the data stream distribution engine can process the information regarding specific protocol(s) to be monitored to determine a suitable (e.g., optimal) filtering strategy.

The diagnostics engine facilitates network diagnostics and/or self-healing. The protocol state compressor(s) analyze protocol specific subset(s) of the real-time network data received from the data stream distribution engine. The protocol state compressor(s) utilize protocol specific rule(s) to abstract and/or analyze relevant information about the specific protocol without having to strictly process the protocol or preserve protocol state variable(s) in order to determine the state of the specific protocol. Based upon this analysis, the protocol state compressor(s) can generate event(s) for undesirable state(s) (e.g., error(s) and/or failure(s)) and/or congested state(s) for use by the event correlator/inference engine. Additionally, the protocol state compressor(s) can provide information to the event correlator/inference engine regarding the state of the specific protocol (e.g., success(es)).

The event correlator/inference engine receives, processes and/or correlates information received from the protocol state compressor(s). Additionally, the event correlator/inference engine can utilize historical information stored by the diagnostics engine regarding the condition of network connectivity. The event correlator/inference engine can further utilize information received from the protocol state compressor(s) to detect system problem(s) (e.g., related to network connectivity), diagnose potential source(s) of the system problem(s) and/or initiate corrective action(s) related to the system problem(s). The event correlator/inference engine can determine a priority ranking of system problem(s) to facilitate initiation of corrective action(s).

Based at least in part upon the analysis of the protocol state compressor(s) and/or the event correlator/inference engine, the diagnostics engine can determine the condition of network connectivity. Further, the diagnostics engine can store historical information regarding the condition of network connectivity, for example, to be used by the event correlator/inference engine, a user and/or a system administrator. Further, the diagnostics engine can adaptively determine which protocol state compressor(s) to instantiate and/or or remove.

Yet another aspect of the present invention provides for a server to have a diagnostic engine having a protocol specific event information store and a plain language notification information store. The protocol specific event information store and the plain language notification information store are used by a self-healing component to facilitate network diagnostics.

Yet other aspects of the present invention provide methods methodologies for performing network diagnostics and managing protocol state compressor(s) and corresponding lexical rule set(s), a computer readable medium having computer usable instructions for a network diagnostics, a computer readable medium having computer usable instructions for network diagnostics and a data packet adapted to be transmitted between two or more computer processes comprising protocol diagnostic information.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
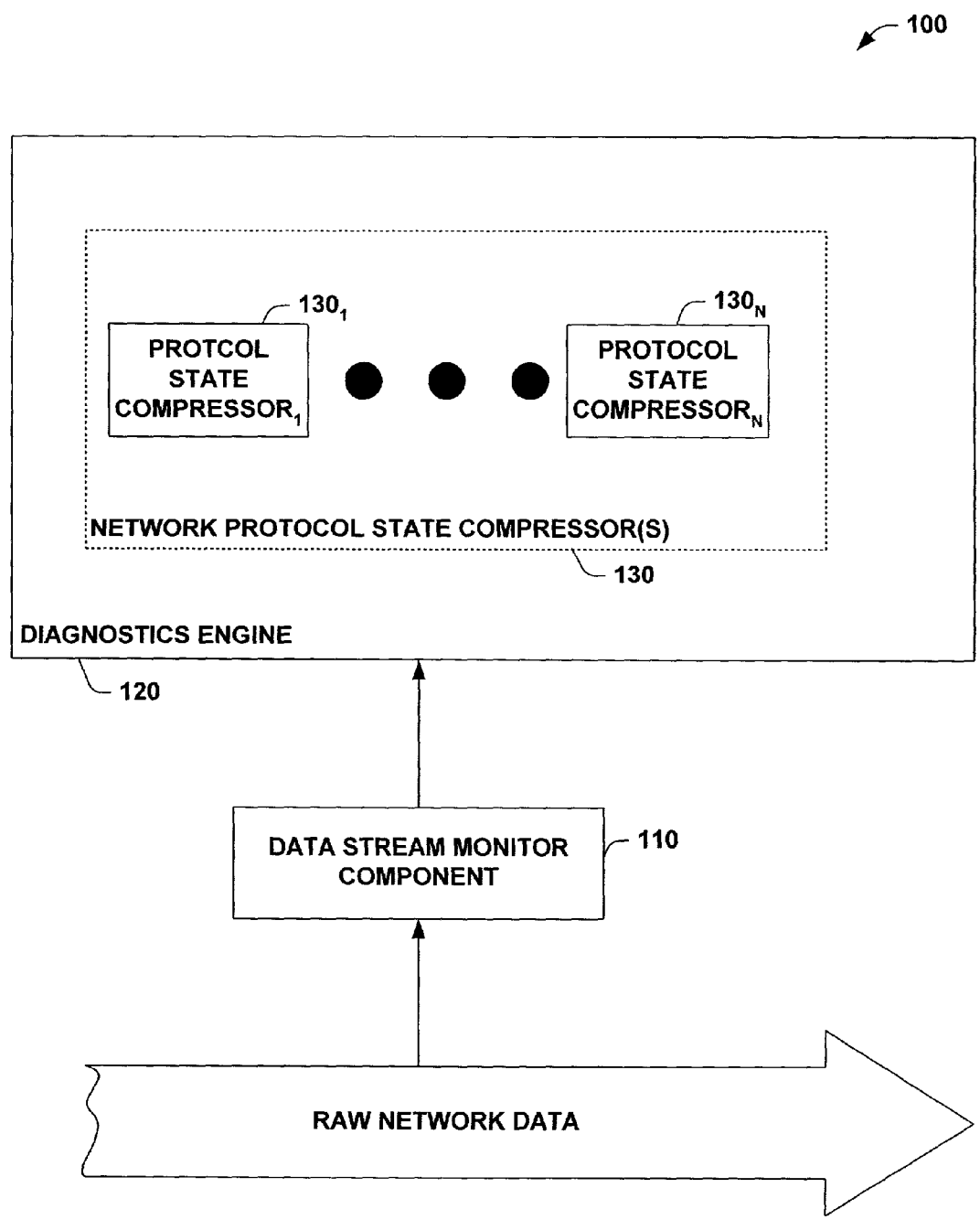
FIG. 1 is block diagram of a protocol diagnostic system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component", "engine" and "compressor" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Referring to FIG. 1, a protocol diagnostic system 100 in accordance with an aspect of the present invention is illustrated. The protocol diagnostic system 100 includes a data stream monitor component 110 and a diagnostics engine 120. The diagnostics engine 120 includes a first protocol state compressor $130_1$ through an Nth protocol state compressor $130_N$, N being an integer greater to or equal to one. The protocol state compressor $130_1$ through $130_N$ can be referred to collectively as the protocol state compressor(s) 130. Optionally, the protocol diagnostics system 100 can include lexical rule set(s) 140 as shown in FIG. 2.

The data stream monitor component 110 accesses (e.g., monitors) raw network data and selectively copies protocol specific subset(s) of the raw network data. The protocol specific subset(s) of data are provided to a corresponding protocol state compressor(s) 130. Typically, a particular protocol state compressor(s) 130 will receive subset(s) of data associated with a single protocol. For example, a protocol state compressor(s) 130 associated with the Domain Name Service (DNS) protocol can receive subset(s) of data (e.g., frame(s)) related to the DNS protocol, while a second protocol state compressor(s) 130 associated with the Hypertext Transfer Protocol (HTTP) can receive subset(s) of data (e.g., frame(s)) related to the HTTP protocol.

Figure 2:
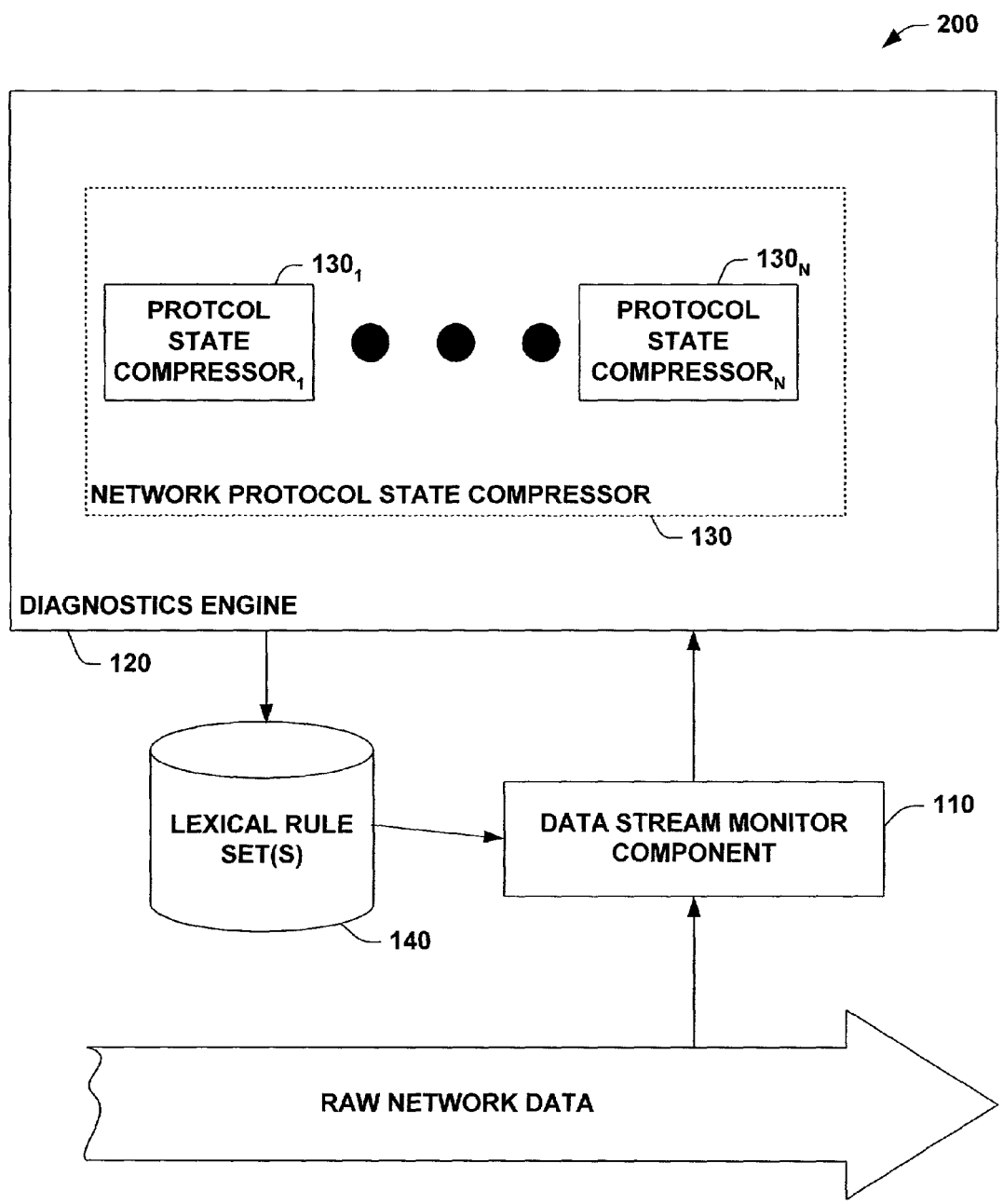
FIG. 2 is block diagram of a protocol diagnostic system employing lexical rule set(s) in accordance with an aspect of the present invention

Optionally, as shown in FIG. 2, the data stream monitor component 110 can utilize lexical rule set(s) 140 to determine the subset(s) of data to be copied. The lexical rule set(s) 140 can store information regarding structure of subset(s) of data (e.g., frame(s)) the diagnostics engine 120 desires the data stream monitor component 110 to copy and provide to the protocol state compressor(s) 130. The lexical rule set(s) 140 can be separate physical data store(s), included in the diagnostics engine 120, included in the data stream monitor component 110 and/or a combination thereof.

Upon instantiation of a specific protocol state compressor(s) 130, the protocol state compressor(s) 130 and/or the diagnostics engine 120 can store protocol specific information in the lexical rule set(s) 140. For example, upon instantiation of a protocol state compressor(s) 130 associated with DNS, the protocol state compressor(s) 130 can store information (e.g., data frame type and copy length) in the lexical rule set(s) 140.

The lexical rule set(s) 140 can provide structural information to the data stream monitor component 110 regarding protocol(s) to be monitored, for example, Address Resolution Protocol/Reverse Address (ARP/RARP), Data Link Switching Client Access Protocol (DCAP), Layer 2 Tunneling Protocol (L2TP), Dynamic Host Configuration Protocol (DHCP), Internet Control Message Protocol (ICMP), user datagram protocol (UDP), Internet Group Management Protocol (IGMP), Multicast Address Resolution Server (MARS) protocol, Protocol Independent Multicast-Spare Mode (PIM-SM) protocol, Routing Information Protocol (RIP2), RIPng for IPv6 protocol, Resource ReSerVAtion setup Protocol (RSVP), Virtual Router Redundancy Protocol (VRRP), Authentication Header (AH) protocol, Encapsulating Security Payload (ESP) protocol, Border Gateway Protocol (BGP-4), Exterior Gateway Protocol (EGP), Enhanced Interior Gateway Routing Protocol (EIGRP), Generic Routing Encapsulation (GRE) protocol, Interior Gateway Routing (IGRP), NBMA (Non-Broadcast, Multi-Access) Address Resolution Protocol (NARP), Next Hop Resolution Protocol (NHRP), Open Shortest Path First (OSPF), Reliable UDP (RUDP), Transport Adapter Layer Interface (TALI) protocol, Van Jacobson compressed TCP protocol, X.25 over TCP (XOT) protocol, DNS, NetBIOS/IP, Lightweight Directory Access Protocol (LDAP), Common Open Policy Service (COPS) protocol, File Transfer Protocol (FTP), Trivial File Transfer Protocol (TFTP), Finger User Information Protocol, HTTP, Secure Hypertext Transfer Protocol (S-HTTP), Internet Message Access Protocol rev. 4 (IMAP4), IP Device Control (IPDC) protocol, Internet Message Access Protocol version 4 rev. 1 (ISAKMP), Network Time Protocol (NTP), Post Office Protocol version 3 (POP3), Radius protocol, Remote login (RLOGIN) protocol, Real-time streaming Protocol (RTSP), Stream Control Transmission Protocol (SCTP), Service Location Protocol (SLP), Simple Mail Transfer Protocol (SMTP), Simple Network Management Protocol (SNMP), SOCKS protocol, TACACS+ protocol, TELNET protocol, Web Cache Coordination Protocol (WCCP), and/or X-Window protocol.

Utilizing the lexical rule set(s) 140, the data stream monitor component 110 can determine which subset(s) of raw network data to copy and/or an amount of the raw network data to copy. For example, the lexical rule set(s) 140 associated with a particular protocol (e.g., HTTP) can specify that only a portion of a data frame associated with the protocol be copied (e.g., header information).

The diagnostics engine 120 can provide at least some of the information stored in the lexical rule set(s) 140. Information stored in the lexical rule set(s) 140 can be static (e.g., stored by the diagnostics engine 120 upon initialization) and/or dynamic (e.g., protocol(s) added and/or deleted by the diagnostics engine 120). For example, the diagnostics engine 120, upon initialization can store information associated with protocol(s) to be monitored in the lexical rule set(s) 140. Upon determining that a network connectivity problem has potentially occurred (e.g., from the protocol state compressor(s) 130), the diagnostics engine 120 can store information associated with additional protocol(s) to be monitored in the lexical rule set(s) 140. Similarly, upon determining that a network connectivity problem has been corrected (e.g., by the diagnostics engine 120 and/or externally), the diagnostics engine 120 can delete information associated with selected protocol(s) from the lexical rule set(s) 140. By selectively adding and/or deleting information associated with protocol(s) stored in the lexical rule set(s) 140, the impact of the protocol diagnostic system 100 on a computer system (e.g., client system) can be minimized.

Referring back to FIG. 1, the protocol state compressor(s) 130 can analyze protocol specific subset(s) of the raw network data received from the data stream monitor component 110. The protocol state compressor(s) 130 can utilize protocol specific rule(s) to abstract and/or analyze relevant information about the specific protocol without having to strictly process the protocol or preserve protocol state variable(s) in order to analyze the state of the specific protocol. The protocol state compressor(s) 130 is adapted to analyze protocol specific subset(s) of raw network data received from the data stream monitor component 110.

The diagnostics engine 120 facilitates network diagnostics and/or self-healing. The diagnostics engine 120 includes at least one protocol state compressor(s) 130. Based at least in part upon the analysis of the protocol state compressor(s) 130, the diagnostics engine 120 can determine, for example, the condition of network connectivity. The diagnostics engine 120 can store historical information regarding the condition of network connectivity. Additionally, based at least in part upon analysis of the protocol state compressor(s) 130, the diagnostics engine 120 can detect problem(s) and attempt to diagnose potential source(s) of the problem(s). Further, the diagnostics engine 120 can initiate corrective action(s) and output diagnostic information (e.g., to a user). For example, upon learning of a failure for a request for service from one or more protocol state compressors 130, the diagnostics engine 120 can facilitate correcting the problem (e.g., by initiating the server service) and/or outputting diagnostic information to a user (e.g., by providing graphical and/or textual information related to the failure).

Further, the diagnostics engine 120 can adaptively determine which protocol state compressors 130 to instantiate. For example, during normal operations, the diagnostics engine 120 can instantiate one or more high level (e.g., application level) protocol state compressors 130. Upon learning of a protocol specific inconsistency from a protocol state compressor(s) 130, the diagnostics engine 120 can instantiate one or more additional protocol state compressors 130 (e.g., session layer, transport layer, network layer and/or data link layer) to facilitate diagnosis of the source(s) of the inconsistency and/or initiate corrective action(s). Additionally, upon diagnosing and/or initiating corrective action, the diagnostics engine 120 can adaptively remove one or more protocol state compressors 130.

While FIG. 1 is a schematic diagram illustrating components for the system 100, it is to be appreciated that the system 100 can be implemented as one or more components, as that term is defined herein. Thus, it is to be appreciated that computer executable components operable to implement the system 100 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 3:
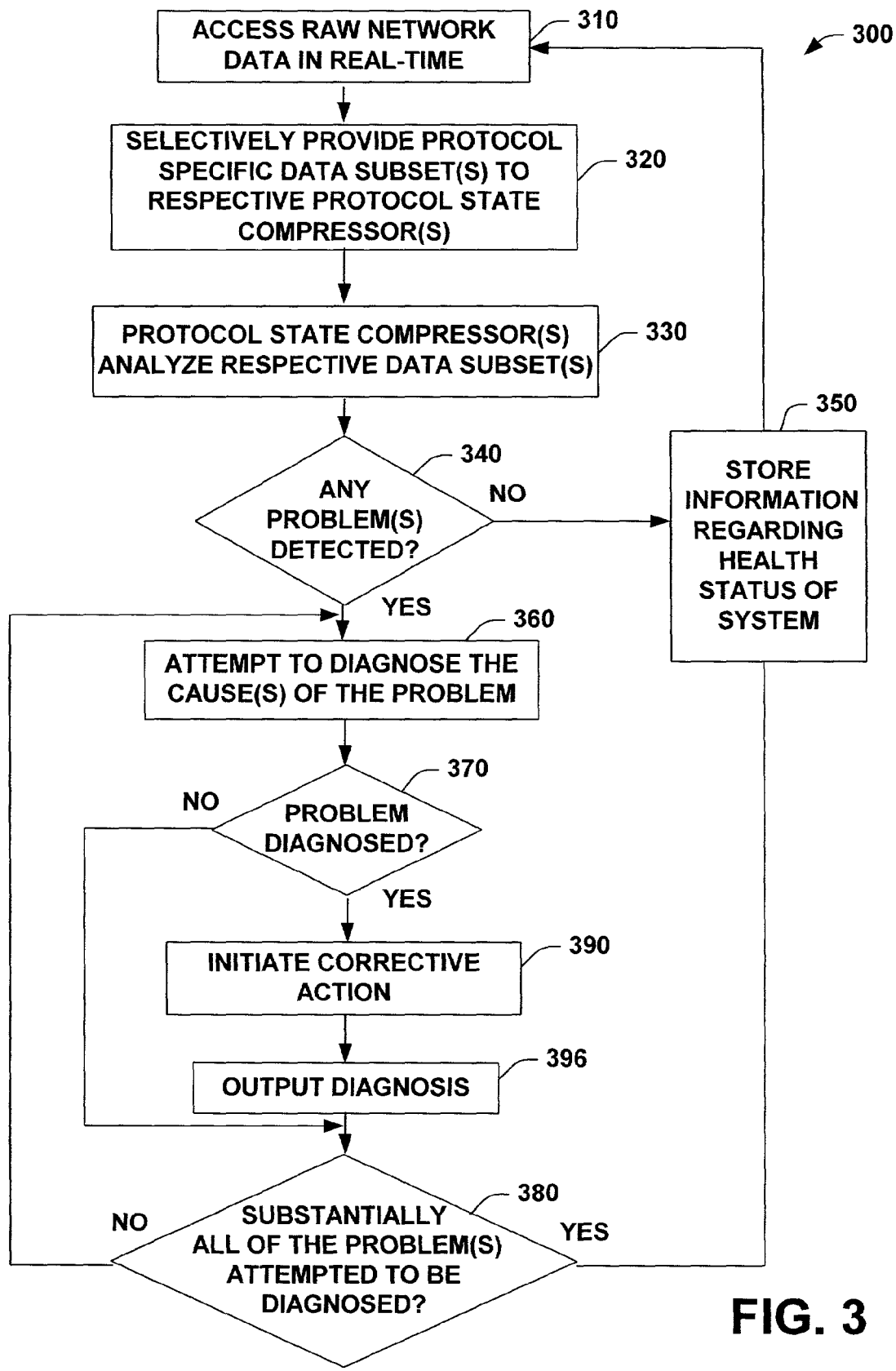
FIG. 3 is a flow chart illustrating a methodology for performing network diagnostics in accordance with an aspect of the present invention.

In view of the exemplary systems shown and described above, a methodology that may be implemented in accordance with the present invention will be better appreciated with reference to the flow chart of FIG. 3. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 3, a methodology 300 for performing network diagnostics in accordance with an aspect of the present invention is illustrated. At 310, raw network data is accessed in real-time (e.g., by the data stream monitor component 110). At 320, selected protocol specific data subset(s) are provided to respective protocol state compressor(s) (e.g., by the data stream monitor component 110). For example, the selected protocol specific data subset(s) can be based at least in part upon lexical rule set(s) 140. At 330, protocol state compressor(s) (e.g., the protocol state compressor(s) 130) analyze respective data subset(s). At 340, a determination is made (e.g., by the diagnostics engine 120) whether any problem(s) (e.g., associated with network connectivity) have been detected. If the determination at 340 is NO, processing continues at 350. If the determination at 340 is YES, at 360, an attempt to diagnose the cause(s) of the problem is made (e.g., by the diagnostics engine 120). Next, at 370, a determination is made whether the problem has been diagnosed. If the determination at 370 is NO, processing continues at 380. If the determination at 370 is YES, at 390, corrective action is initiated, as appropriate (e.g., related to network connectivity). At 396, diagnosis information is output (e.g., to a user). Next, at 380, a determination is made whether substantially all of the problem(s) have been attempted to be diagnosed. If the determination at 380 is NO, processing continues at 360. If the determination at 380 is YES, at 350, information regarding the health status of the system is stored (e.g., associated with network connectivity) and processing continues at 310. For example, a user can access the stored information regarding the health status of the system (e.g., associated with network connectivity). It is to be appreciated that the determination at 380 can be based, at least in part, upon, for example, user preference(s), historical information and/or a hierarchical ranking of problem(s).

Figure 4:
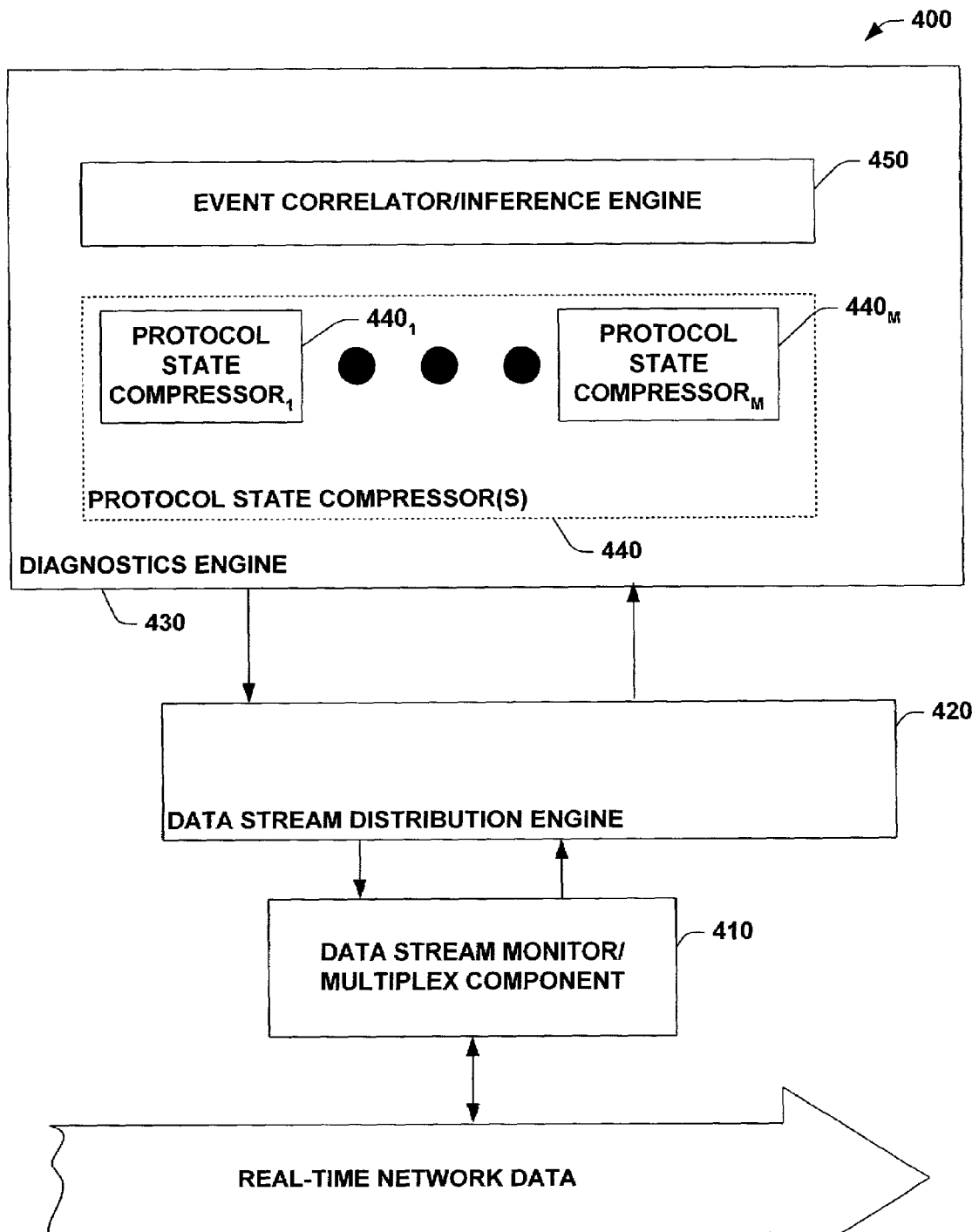
FIG. 4 is a block diagram of a protocol diagnostics system in accordance with an aspect of the present invention.

Next, referring to FIG. 4, a protocol diagnostics system 400 in accordance with an aspect of the present invention is illustrated. The protocol diagnostics system 400 includes a data stream monitor/multiplex component 410, a data stream distribution engine 420 and a diagnostics engine 430. The diagnostics engine 430 includes a first protocol state compressor $440_1$ through an Mth protocol state compressor $440_M$, M being an integer greater to or equal to one. The protocol state compressor $440_1$ through $440_M$ can be referred to collectively as the protocol state compressor(s) 440. The diagnostics engine 430 further includes an event correlator/inference engine 450.

The data stream monitor/multiplex component 410 accesses (e.g., monitors) real-time network data and selectively copies protocol specific subset(s) of the real-time network data. The protocol specific subset(s) of data are multiplexed by the data stream monitor/multiplex component 410 and provided to the data stream distribution engine 420. The data stream monitor/multiplex component 410 can receive information regarding specific protocol(s) to monitor and copy from the data stream distribution engine 420. The data stream monitor/multiplex component 410 can monitor real-time network data as opposed to network data that has passed through a protocol stack.

Accordingly, the protocol diagnostics system 400 can generally be passive to the network and mitigate associated impact on network bandwidth.

For example, the data stream distribution engine 420 can identify the protocol(s) to be monitored and the amount of data to be copied for each protocol. The data stream monitor/multiplex component 410 can then monitor the real-time network data for data frame(s) corresponding to the protocol(s) to be monitored. For data frame(s) corresponding to the protocol(s) to be monitored, the data stream monitor/multiplex component 410 can copy appropriate subset(s) of data, based at least in part upon information received from the data stream distribution engine 420, multiplex the subset(s) and send the multiplexed subset(s) of data to the data stream distribution engine 420. The protocol(s) to be monitored by the data stream monitor/multiplex component 410 can be static (e.g., identified at initialization) and/or dynamic (e.g., added and/or deleted protocol(s) identified by the data stream distribution engine 420).

The data stream distribution engine 420 demultiplexes the multiplexed data subset(s) passing them to corresponding protocol state compressor(s) 440. Typically, a particular protocol state compressor 440 will receive subset(s) of data associated with a single protocol. Further, the data stream distribution engine 420 receives information (e.g., lexical rule set(s)) regarding specific protocol(s) to be monitored from the diagnostics engine 430 and/or the protocol state compressor(s) 440. The information (e.g., lexical rule set(s)) can be a separate physical data store(s) (not shown), included in the diagnostics engine 430, included in the data stream monitor component 420 and/or a combination thereof.

Optionally, the data stream distribution engine 420 can process the information regarding specific protocol(s) to be monitored to determine a suitable (e.g., optimal) filtering strategy. For example, in the event that multiple protocol state compressor(s) 440 identify a common protocol (e.g., IP) to be monitored, the data stream distribution engine 420 can determine that it is only necessary to monitor the real-time network data for the common protocol once. Based on determination of this determination, the data stream distribution engine 420 can identify to the data stream monitor/multiplex component 410, the common protocol to be monitored and a superset of the amount of corresponding data to be copied.

The diagnostics engine 430 facilitates network diagnostics and/or self-healing. The diagnostics engine 430 includes protocol state compressor(s) 440 and an event correlator 450. The protocol state compressor(s) 440 can analyze protocol specific subset(s) of the real-time network data received from the data stream distribution engine 420. The protocol state compressor(s) 440 can utilize protocol specific rule(s) to abstract and/or analyze relevant information about the specific protocol without having to strictly process the protocol or preserve protocol state variable(s) in order to determine the state of the specific protocol. Based upon this analysis, the protocol state compressor(s) 440 can generate event(s) for undesirable state(s) (e.g., error(s) and/or failure(s)) and/or congested state(s) for use by the event correlator/inference engine 450. For example, the protocol state compressor(s) 440 can generate a protocol specific identifier and/or a protocol specific event associated with a network problem and/or network status. Additionally, the protocol state compressor(s) 440 can provide information to the event correlator/inference engine 450 regarding the state of the specific protocol (e.g., success(es)).

For example, protocol state compressor(s) 440 can analyze Address Resolution Protocol/Reverse Address (ARP/RARP), Data Link Switching Client Access Protocol (DCAP), Layer 2 Tunneling Protocol (L2TP), Dynamic Host Configuration Protocol (DHCP), Internet Control Message Protocol (ICMP), user datagram protocol (UDP), Internet Group Management Protocol (IGMP), Multicast Address Resolution Server (MARS) protocol, Protocol Independent Multicast-Spare Mode (PIM-SM) protocol, Routing Information Protocol (RIP2), RIPng for IPv6 protocol, Resource ReSerVAtion setup Protocol (RSVP), Virtual Router Redundancy Protocol (VRRP), Authentication Header (AH) protocol, Encapsulating Security Payload (ESP) protocol, Border Gateway Protocol (BGP-4), Exterior Gateway Protocol (EGP), Enhanced Interior Gateway Routing Protocol (EIGRP), Generic Routing Encapsulation (GRE) protocol, Interior Gateway Routing (IGRP), NBMA (Non-Broadcast, Multi-Access) Address Resolution Protocol (NARP), Next Hop Resolution Protocol (NHRP), Open Shortest Path First (OSPF), Reliable UDP (RUDP), Transport Adapter Layer Interface (TALI) protocol, Van Jacobson compressed TCP protocol, X.25 over TCP (XOT) protocol, DNS, NetBIOS/IP, Lightweight Directory Access Protocol (LDAP), Common Open Policy Service (COPS) protocol, File Transfer Protocol (FTP), Trivial File Transfer Protocol (TFTP), Finger User Information Protocol, HTTP, Secure Hypertext Transfer Protocol (S-HTTP), Internet Message Access Protocol rev. 4 (IMAP4), IP Device Control (IPDC) protocol, Internet Message Access Protocol version 4 rev. 1 (ISAKMP), Network Time Protocol (NTP), Post Office Protocol version 3 (POP3), Radius protocol, Remote login (RLOGIN) protocol, Real-time streaming Protocol (RTSP), Stream Control Transmission Protocol (SCTP), Service Location Protocol (SLP), Simple Mail Transfer Protocol (SMTP), Simple Network Management Protocol (SNMP), SOCKS protocol, TACACS+ protocol, TELNET protocol, Web Cache Coordination Protocol (WCCP), and/or X-Window protocol. A specific protocol state compressor(s) 440, for example, can be instantiated to analyze HTTP request(s) and associated response(s)/failure(s) to respond.

The event correlator/inference engine 450 can receive information from the protocol state compressor(s) 440. The information can include event(s) related to undesirable state(s) (e.g., error(s) and/or failure(s)) and/or congested state(s) and/or the state of specific protocol(s) (e.g., success(es)). The event correlator/inference engine 450 can process and correlate the information received from the protocol state compressor(s) 440. Additionally, the event correlator/inference engine 450 can utilize historical information stored by the diagnostics engine 430, for example, regarding the condition of network connectivity.

For example, the event correlator/inference engine 450 can receive information from a processor state compressor 440 associated with TCP traffic that an error event has occurred and information from a second processor state compressor 440 associated with ARP traffic that notices a lack of traffic. Utilizing this information, the event correlator/inference engine 450 can determine that a hub or concentrator problem may exist.

The event correlator/inference engine 450 can further utilize information received from the protocol state compressor(s) 440 to detect system problem(s) (e.g., related to network connectivity), diagnose potential source(s) of the system problem(s) and/or initiate corrective action(s) related to the system problem(s). The event correlator/inference engine 450 can determine a priority ranking of system problem(s) to facilitate initiation of corrective action(s). For example, in determining the priority ranking, the event correlator/inference engine 450 can utilize a static ranking system (e.g., IP problem(s) always being ranked higher than HTTP problem(s)). Alternatively, the event correlator/inference engine 450 can determine an expected utility associated with the potential system problem(s) and/or corrective action(s)—potential system problem(s) and/or corrective action(s) having the higher expected utility being dealt with before those of lower expected utility. Optionally, the event correlator/inference engine 450 can utilize artificial intelligence technique(s) (e.g., neural network(s) and/or expert system(s)) to facilitate diagnosis of the potential source of the system problem.

Based at least in part upon the analysis of the protocol state compressor(s) 440 and/or the event correlator/inference engine 450, the diagnostics engine 430 can determine the condition of network connectivity. Further, the diagnostics engine 430 can store historical information regarding the condition of network connectivity, for example, to be used by the event correlator/inference engine 450, a user (not shown) and/or a system administrator (not shown). Accordingly, the protocol diagnostics system 400 can provide a mechanism for network self-healing, protection against denial-of-service attacks, network data mining, and other new applications.

Further, the diagnostics engine 430 can adaptively determine which protocol state compressor(s) 440 to instantiate. For example, during normal operations, the diagnostics engine 440 can instantiate one or more high level (e.g., application level) protocol state compressor(s) 440. Upon learning of a protocol specific problem (e.g., event) from the protocol state compressor(s) 440 and/or the event correlator/inference engine 450, the diagnostics engine 430 can instantiate one or more additional protocol state compressor(s) 440 (e.g., session layer, transport layer, network layer and/or data link layer) to facilitate diagnosis of the source(s) of the problem and/or initiate corrective action(s). Additionally, upon diagnosing and/or initiating corrective action, the diagnostics engine 430 can adaptively remove one or more protocol state compressor(s) 440.

Additionally, as additional network protocol(s) are developed, the diagnostics engine 430 can be adapted to utilize the additional network protocol(s) with the addition of corresponding protocol state compressor(s) 440. Thus, the present invention provides for an extensible network protocol diagnostic system.

While FIG. 4 is a schematic diagram illustrating components for the system 400, it is to be appreciated that the system 400 can be implemented as one or more components, as that term is defined herein. Thus, it is to be appreciated that computer executable components operable to implement the system 400 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

In view of the exemplary systems shown and described above, methodologies that may be implemented in accordance with the present invention will be better appreciated with reference to the flow charts of FIGS. 5, 6, 7 and 8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
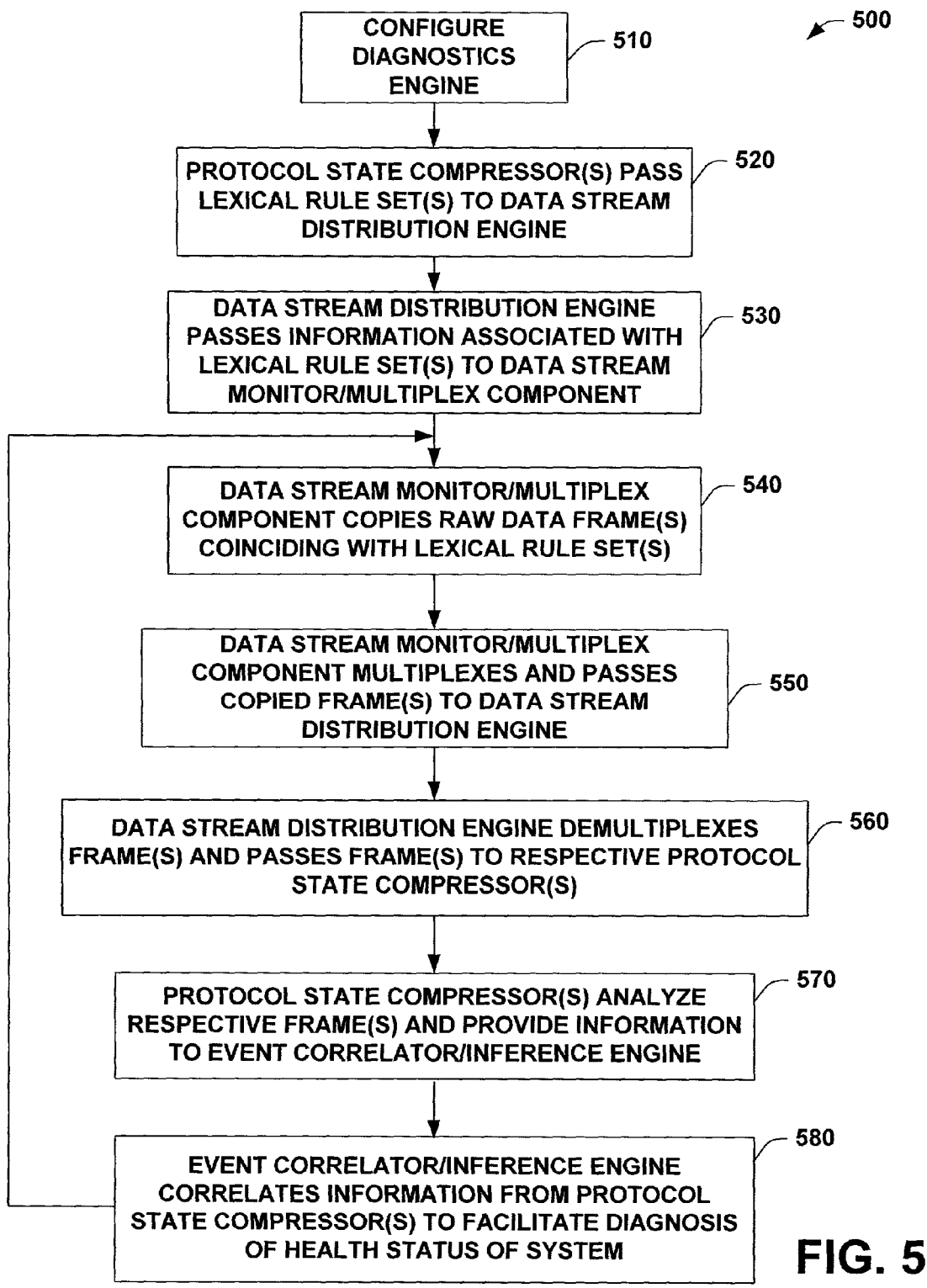
FIG. 5 is a flow chart illustrating a methodology for performing network diagnostics in accordance with an aspect of the present invention.

Turning to FIG. 5, a methodology 500 for performing network diagnostics in accordance with an aspect of the present invention is illustrated. At 510, a diagnostics engine is configured (e.g., protocol state compressor(s) instantiated and/or stored historical data initialized). At 520, protocol state compressor(s) pass lexical rule set(s) (e.g., protocol specific information) to a data stream distribution engine. At 530, the data stream distribution engine passes information associated with the lexical rule set(s) to a data stream monitor/multiplex component. At 540, the data stream monitor/multiplex component copies raw data frame(s) coinciding with the lexical rule set(s). At 550, the data stream monitor/multiplex component multiplexes and passes the copied frame(s) to the data stream distribution engine. At 560, the data stream distribution engine demultiplexes the frame(s) and passes frame(s) to the respective protocol state compressor(s). At 570, the protocol state compressor(s) analyze respective frame(s) and provide information (e.g., event(s) and/or status) to an event correlator/inference engine. At 580, the event correlator/inference engine correlates information (e.g., event(s) and/or status) received from the protocol state compressor(s) to facilitate diagnosis of health status of a system (e.g., network connectivity).

Figure 6:
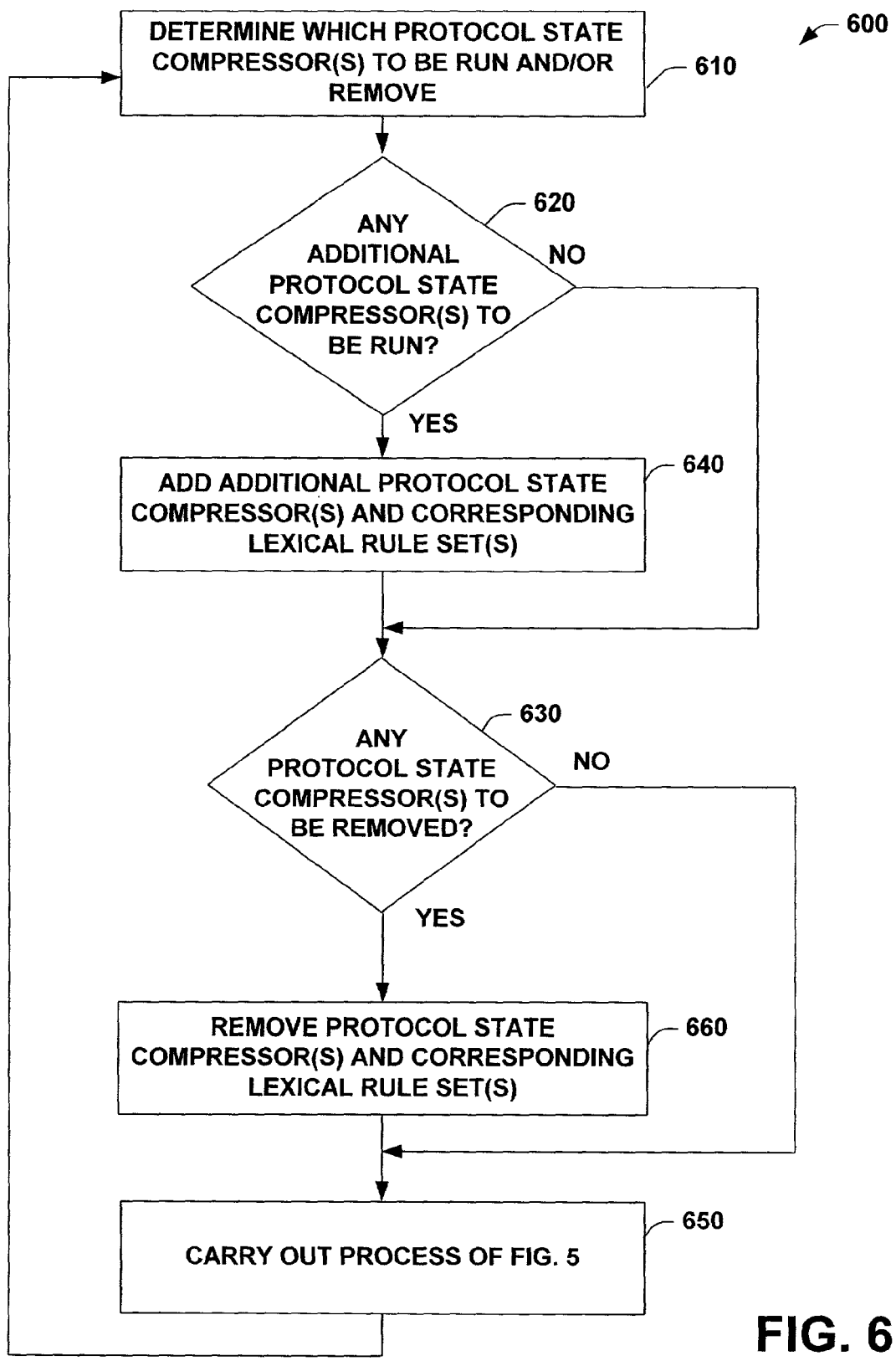
FIG. 6 is a flow chart illustrating a methodology for managing protocol state compressor(s) and corresponding lexical rule set in accordance with an aspect of the present invention.

Referring next to FIG. 6, a method 600 for managing protocol state compressor(s) and associated lexical rule set(s) is illustrated. At 610, protocol state compressor(s) to be run (e.g., instantiated) and/or removed, if any, are determined. At 620, a determination is made whether any additional protocol state compressor(s) are to be run. If the determination at 620 is NO, processing continues at 630. If the determination at 620 is YES, at 640, additional protocol state compressor(s) and corresponding lexical rule set(s) are added. Next, at 630, a determination is made whether any protocol state compressor(s) are to be removed. If the determination at 630 is NO, processing continues at 650. If the determination at 630 is YES, at 660, protocol state compressor(s) and corresponding lexical rule set(s) are removed. Next, at 650, the process of FIG. 5 is carried out and processing continues at 610.

Figure 7:
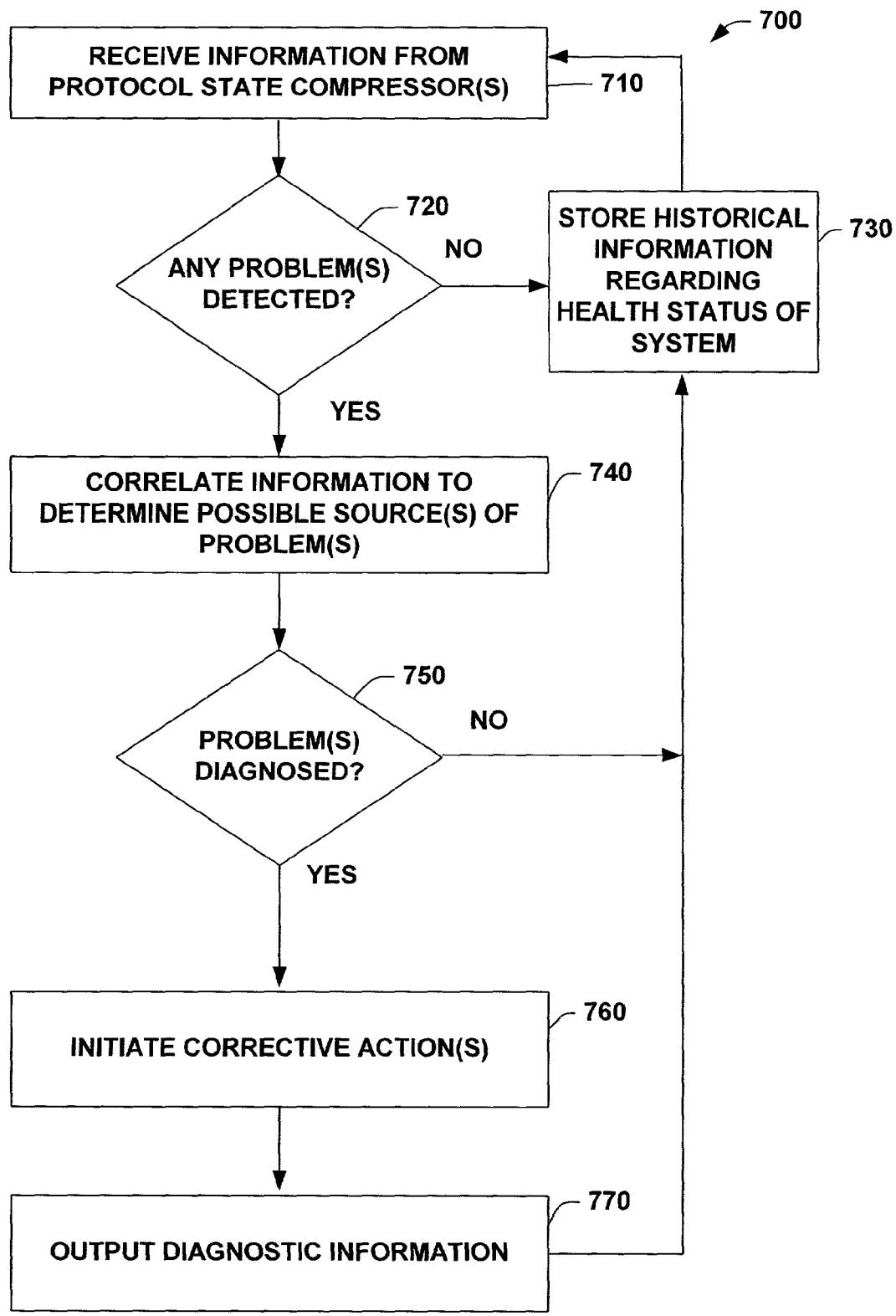
FIG. 7 is a flow chart illustrating a methodology for performing protocol diagnostics utilizing an event correlator/inference engine in accordance with an aspect of the present invention.

Next, turning to FIG. 7, a method 700 for performing protocol diagnostics utilizing an event correlator/inference engine in accordance with an aspect of the present invention. At 710, information (e.g., event(s) and/or status) is received from protocol state compressor(s). At 720, a determination is made whether any problem(s) have been detected. If the determination at 720 is NO, processing continues at 730. If the determination at 720 is YES, at 740, information received from the protocol state compressor(s) is correlated to determine possible source(s) of the problem(s). At 750, a determination is made whether the problem(s) have been diagnosed. If the determination at 750 is NO, processing continues at 730. If the determination at 750 is YES, at 760, corrective action(s) are initiated. At 770, diagnostic information is output (e.g., to a user and/or administrator). At 730, historical information regarding health status of the system is stored and processing continues at 710.

Figure 8:
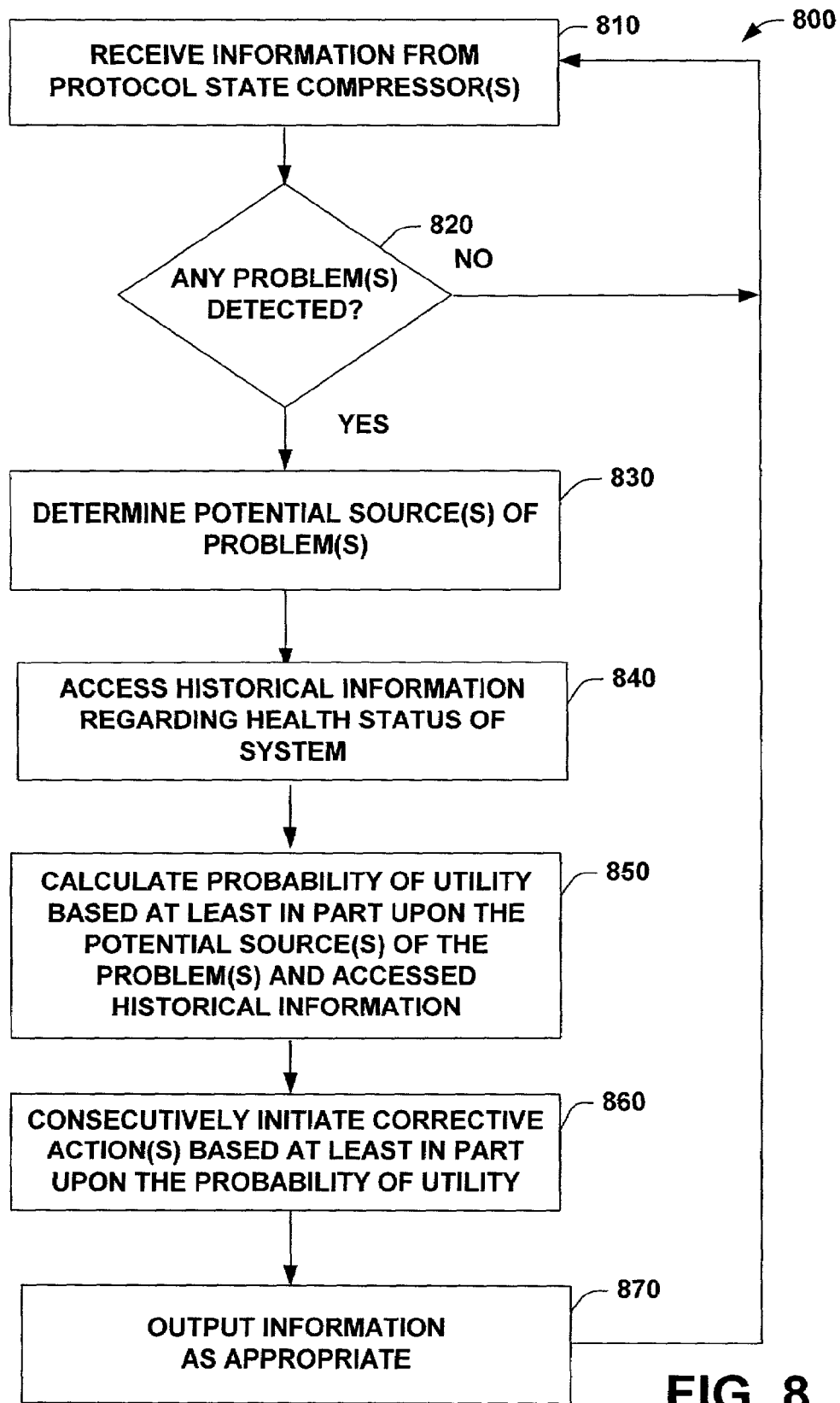
FIG. 8 is a flow chart illustrating a methodology for performing protocol diagnostics utilizing an event correlator/inference engine in accordance with an aspect of the present invention.

Referring next to FIG. 8, a methodology 800 for performing protocol diagnostics utilizing an event correlator/inference engine in accordance with an aspect of the present invention is illustrated. At 810, information (e.g., event(s) and/or status) is received from protocol state compressor(s). At 820, a determination is made whether any problem(s) have been detected. If the determination at 820 is NO, processing continues at 810. If the determination at 820 is YES, at 830, potential source(s) of problem(s) are determined. At 840, historical information regarding health status of the system is accessed. At 850, a probability of utility based at least in part upon the potential source(s) of the problems and accessed historical information is calculated. At 860, corrective action(s) based at least in part upon the probability of utility are initiated consecutively—corrective action(s) having higher calculated probability of utility performed before those having lower calculated probability of utility. At 870, information is output, as appropriate, and processing continues at 810. For example, one or more of the corrective action(s) determined by the event correlator/inference engine can require operator assistance (e.g., be sure the server is powered up).

Figure 9:
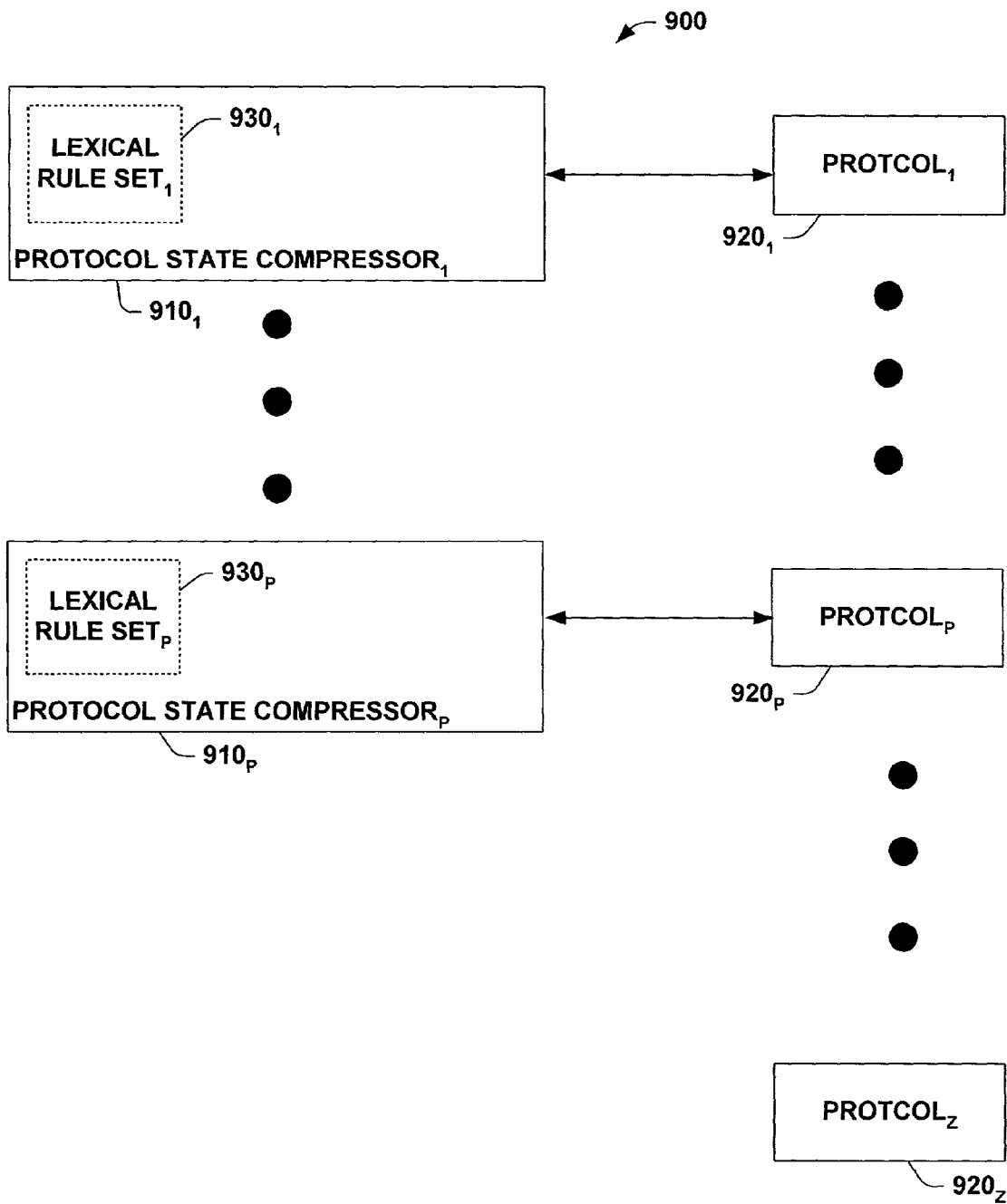
FIG. 9 is a block diagram illustrating a system of protocol state compressors in accordance with an aspect of the present invention.

Turning to FIG. 9, a system of protocol state compressors 900 in accordance with an aspect of the present invention is illustrated. The system 900 includes a first protocol state compressor $910_1$ through a Pth protocol state compressor $910_P$, P being an integer greater to or equal to one. The protocol state compressor $910_1$ through $910_P$ can be referred to collectively as the protocol state compressor(s) 910. Generally, protocol state compressor(s) 910 are associated with a specific protocol collectively referred to as protocol(s) 920. Typically, protocol state compressor(s) 910 include a specific lexical rule set, collectively referred to as lexical rule set(s) 930.

A first protocol state compressor $910_1$ can have a lexical rule set$_1$ $930_1$ and be associated with a protocol$_1$ $920_1$ (e.g., DNS). Similarly, a Pth protocol state compressor 910P can have a lexical rule set$_P$ $930_P$ and be associated with protocol$_P$ $920_P$ (e.g., HTTP). At the point in time reflected in FIG. 9, a Zth protocol $920_Z$, Z being an integer greater to P, is not associated with any protocol state compressor 910; however, at a point in time either before or after the point in time reflected in FIG. 9, a Zth protocol state compressor (not shown) associated with protocols may have been instantiated (e.g., by a diagnostics engine).

Figure 10:
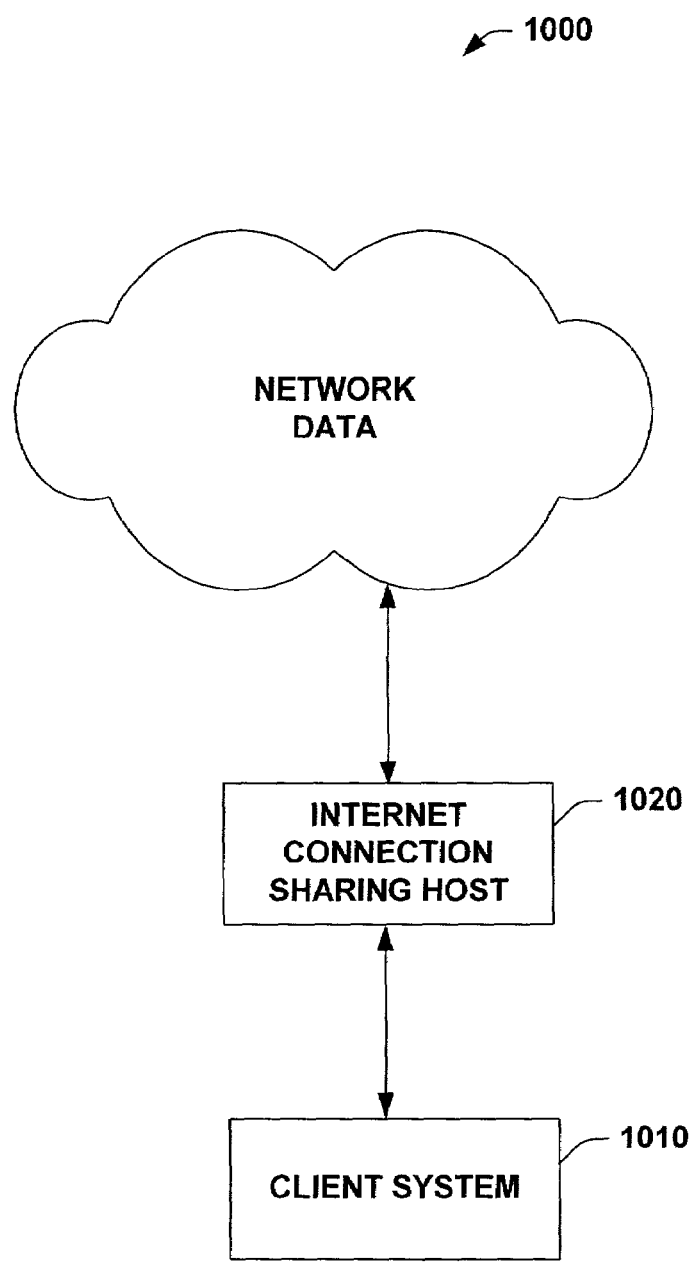
FIG. 10 is a block diagram illustrating a distributed system employing a protocol diagnostics system in accordance with an aspect of the present invention.

Referring to FIG. 10 a distributed system employing a protocol diagnostics system 1000 in accordance with an aspect of the present invention is illustrated. The system 1000 includes a client system 1010 and an Internet connection sharing host 1020. In accordance with an aspect of the invention, a protocol diagnostic system can reside within the client system 1010, the Internet connection sharing host 1020 or be distributed between the client system 1010 and the Internet connection sharing host 1020.

Figure 11:
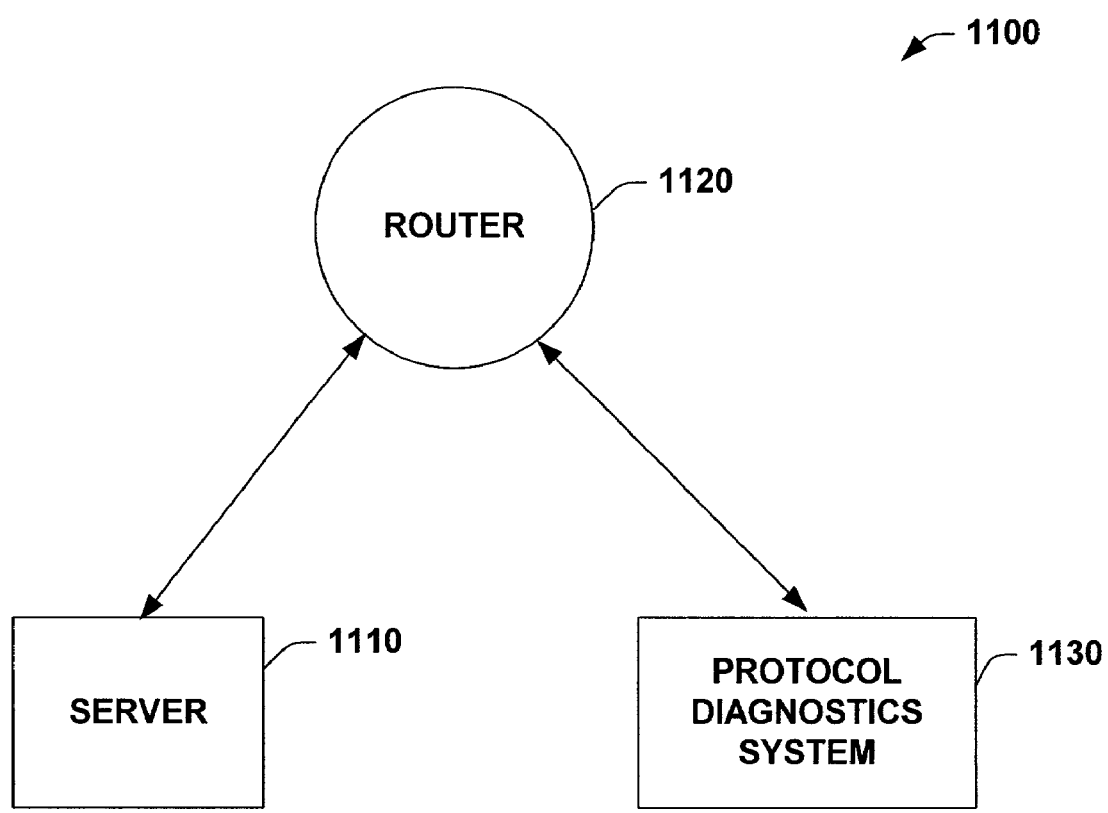
FIG. 11 is a block diagram illustrating a router system employing a protocol diagnostics system in accordance with an aspect of the present invention.

Turning next to FIG. 11, a router system 1100 employing a protocol diagnostics system in accordance with an aspect of the present invention is illustrated. The router system 1100 includes a server 1110, a router 1120 and a protocol diagnostics system 1130.

The router 1120 can route network traffic to the server 1110. The protocol diagnostics system 1130 described infra can monitor network traffic in order to facilitate network diagnostics and/or self-healing.

Figure 12:
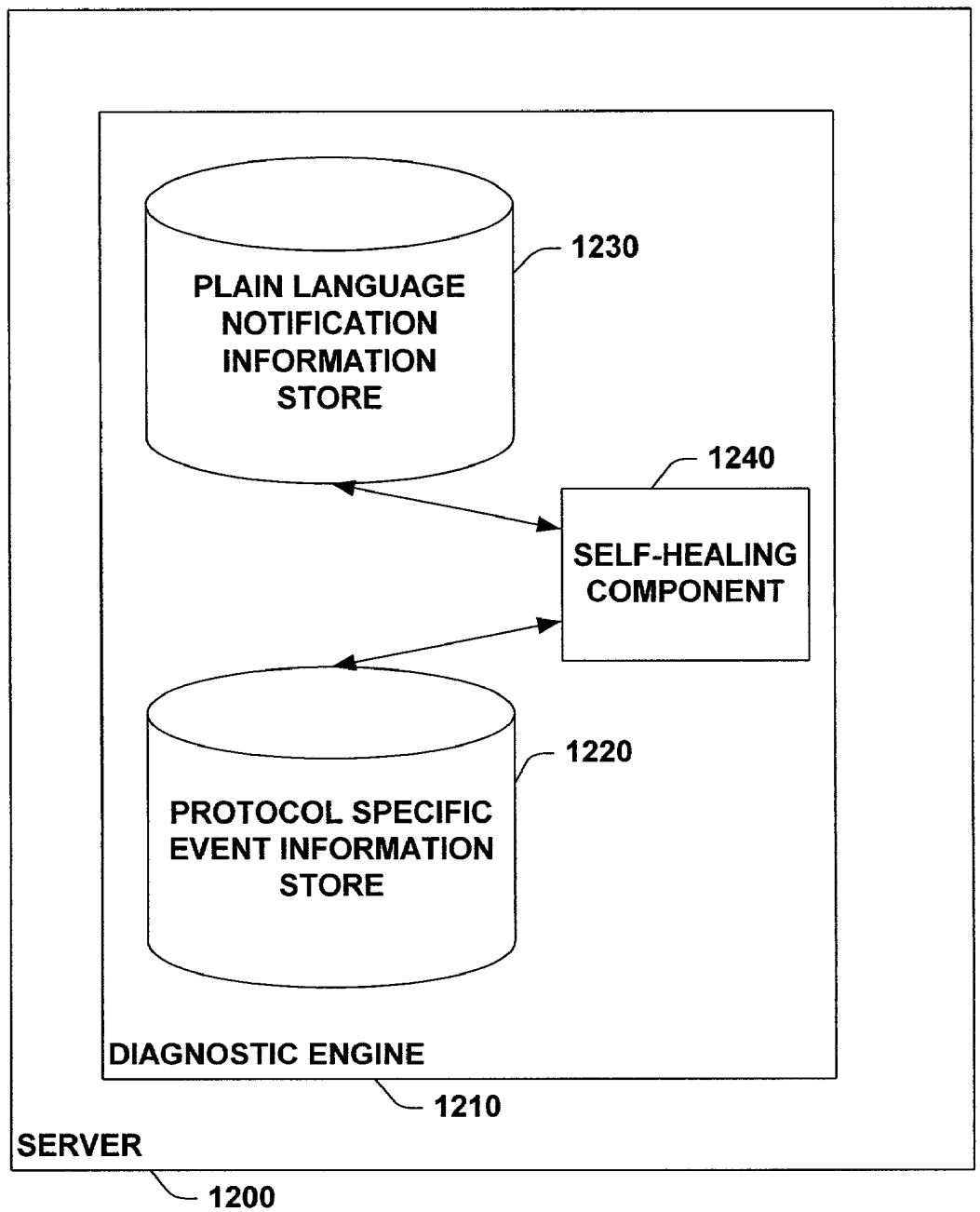
FIG. 12 is a block diagram illustrating a server in accordance with an aspect of the present invention.

Referring next to FIG. 12, a server 1200 in accordance with an aspect of the present invention is illustrated. The server 1200 includes a diagnostics engine 1210 having a protocol specific event information store 1220, a plain language notification information store 1230 and a self-healing component 1240.

The protocol specific event information store 1220 can store information associated with server health status, for example, event(s) and/or status information received from protocol state compressor(s) (not shown). The plain language notification information store 1230 can store information associated with a plurality of potential server problems (e.g., associated with network connectivity).

The self-healing component 1240 is adapted to perform self-healing of server problem(s), for example, associated with network connectivity. Further the self-healing component 1240 is adapted to provide plain language notification associated with server problem(s) (e.g., to a user and/or administrator). The self-healing component 1240 is adapted to analyze information (e.g., event(s) and/or status) stored in the protocol specific event information store 1220 to determine appropriate corrective action(s) related to server 1200 problem(s). The self-healing component 1240 is further adapted to initiate corrective action(s) based at least in part upon information stored in the protocol specific event information store 1220. Further, the self-healing component 1240 is adapted to search the plain language notification information store 1230 for corresponding plain language notification associated with the server 1200 problem(s). The self-healing component 1240 can provide plain language notification (e.g., to a user and/or administrator) based at least in part upon its search of the plain language notification information store 1230. Accordingly, the diagnostics system 1210 can provide a mechanism for server self-healing, protection against denial-of-service attacks, network data mining, and other new applications.

Figure 13:
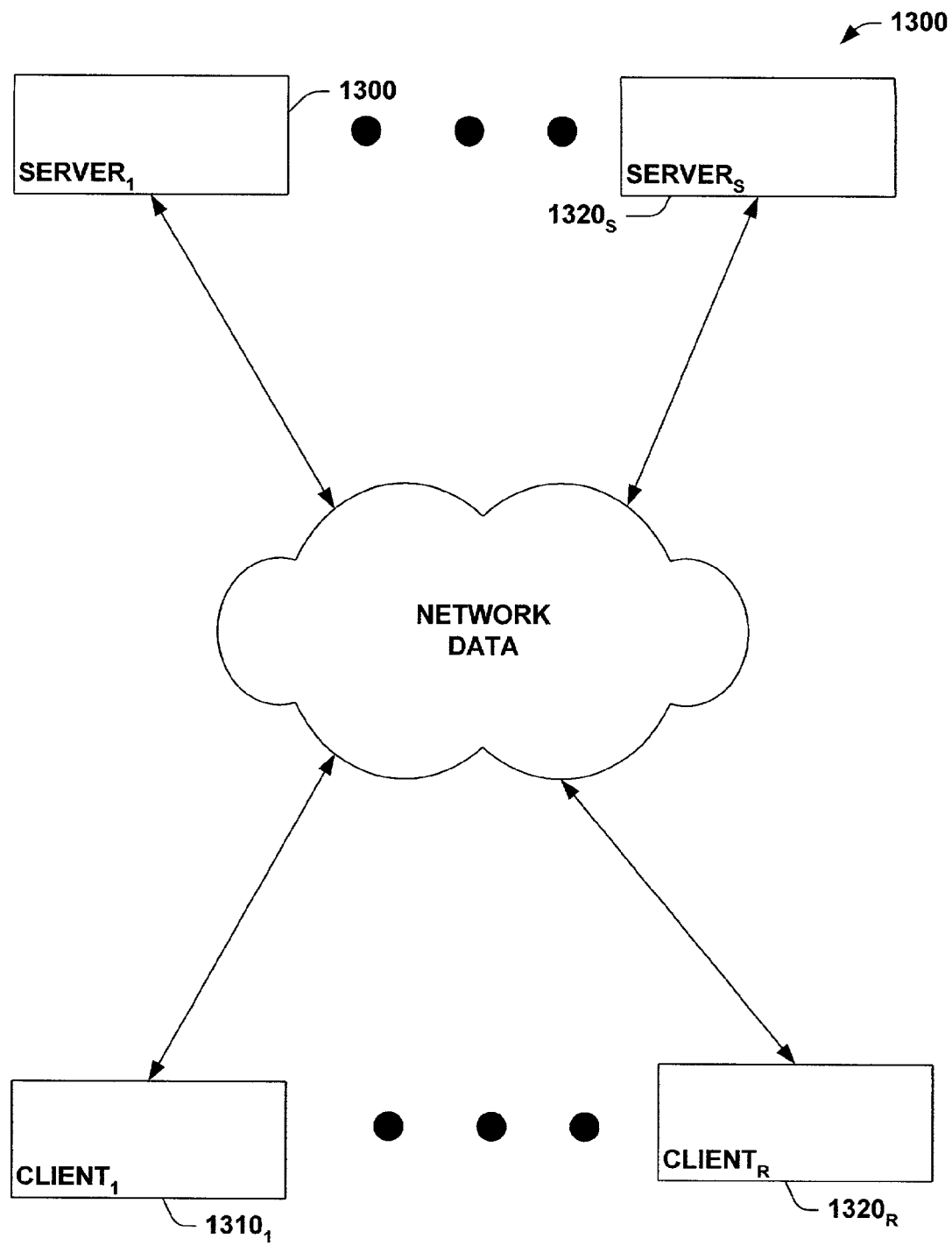
FIG. 13 is a block diagram illustrating a network diagnostics system in accordance with an aspect of the present invention.

Turning to FIG. 13, a network diagnostics system 1300 in accordance with an aspect of the present invention is illustrated. The network diagnostics system 1300 includes a first client 1310$_1$ through an Rth client 1310$_R$, R being an integer greater to or equal to one. The client 1310$_1$ through 1310$_R$ can be referred to collectively as the client(s) 1310. The network diagnostics system 1300 further includes a first server 1320$_1$ through an Sth server 1320$_S$, S being an integer greater to or equal to one. The server 1320$_1$ through 1320$_S$ can be referred to collectively as the server(s) 1320.

The client(s) 1310 and the server(s) 1320 have access to network data 1330. In accordance with an aspect of the present invention, component(s) of the protocol diagnostics system described infra can reside on any one or more of the client(s) 1310 and/or the server(s) 1320.

Figure 14:
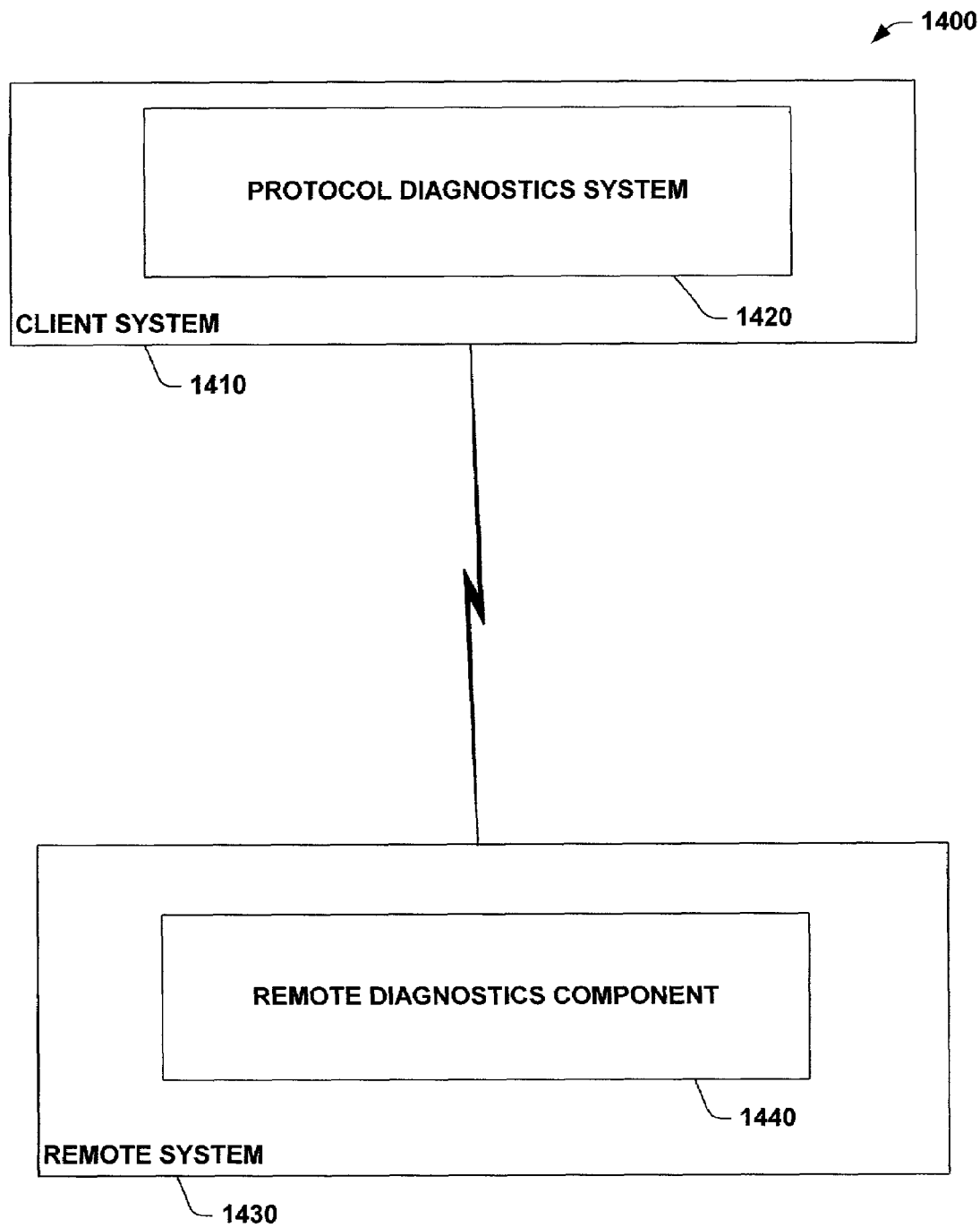
FIG. 14 is a block diagram illustrating a network diagnostics system in accordance with an aspect of the present invention.

Referring to FIG. 14, a network diagnostics system 1400 in accordance with an aspect of the present invention is illustrated. The network diagnostics system 1400 includes a client system 1410 and a remote system 1430.

The client system 1410 includes a protocol diagnostics system 1420 as described infra adapted to perform network diagnostics and/or self-healing. The client system 1410 is adapted to communicate with the remote system 1440. For example, the client system 1410 and the remote system 1440 can communicate via the Internet, an intranet, a serial communication bus, a parallel communication bus and/or other computer communication system(s).

The remote system 1430 includes a remote diagnostics component 1440. The remote diagnostics component 1440 facilitates diagnostics and/or healing of the client system 1410. The remote diagnostics component 1440 can receive information (e.g., event(s) and/or status) from the client system 1410. Based at least in part upon this information, the remote diagnostics component 1440 can initiate corrective action(s) and/or send instruction(s) to the client system 1410. Upon receipt of instruction(s) from the remote diagnostics component 1440, the client system 1410 can then perform the instruction(s) in an attempt to heal problem(s).

Figure 15:
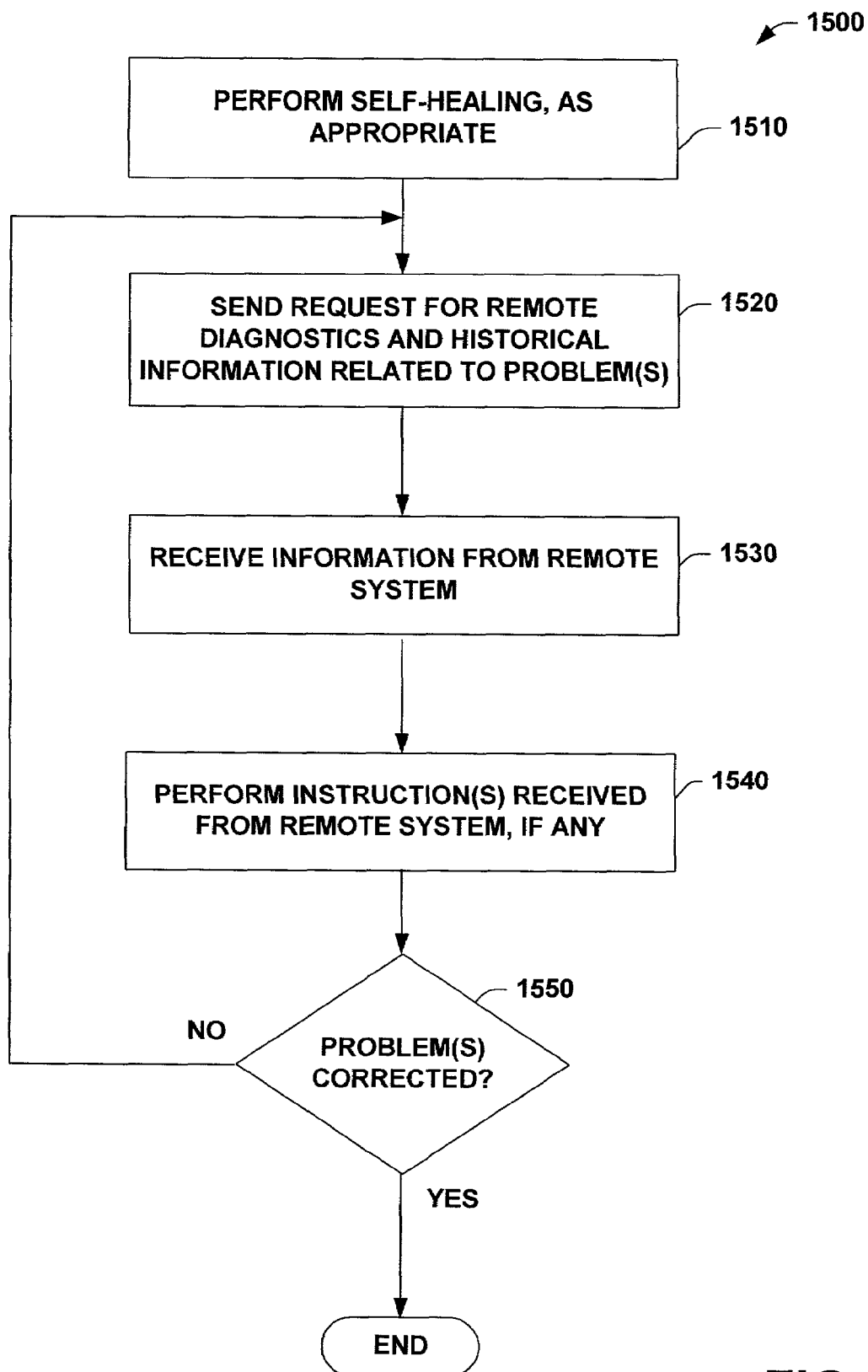
FIG. 15 is a flow chart illustrating a methodology for performing network diagnostics in accordance with an aspect of the present invention

In view of the exemplary systems shown and described above, a methodology that may be implemented in accordance with the present invention will be better appreciated with reference to the flow chart of FIG. 15. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 15, a methodology 1500 for performing network diagnostics in accordance with an aspect of the present invention is illustrated. At 1510, self-healing, as appropriate, is performed (e.g., by a protocol diagnostics system). At 1520, a request for remote diagnostics and information (e.g., event(s) and/or status) related to problem(s) is sent to a remote system. At 1530, information is received from the remote system. At 1540, instruction(s) received from the remote system, if any, are performed (e.g., by a client system). At 1540, a determination is made whether the problem(s) have been corrected. If the determination at 1540 is NO, processing continues at 1520. If the determination at 1550 is YES, no further processing occurs.

Figure 16:
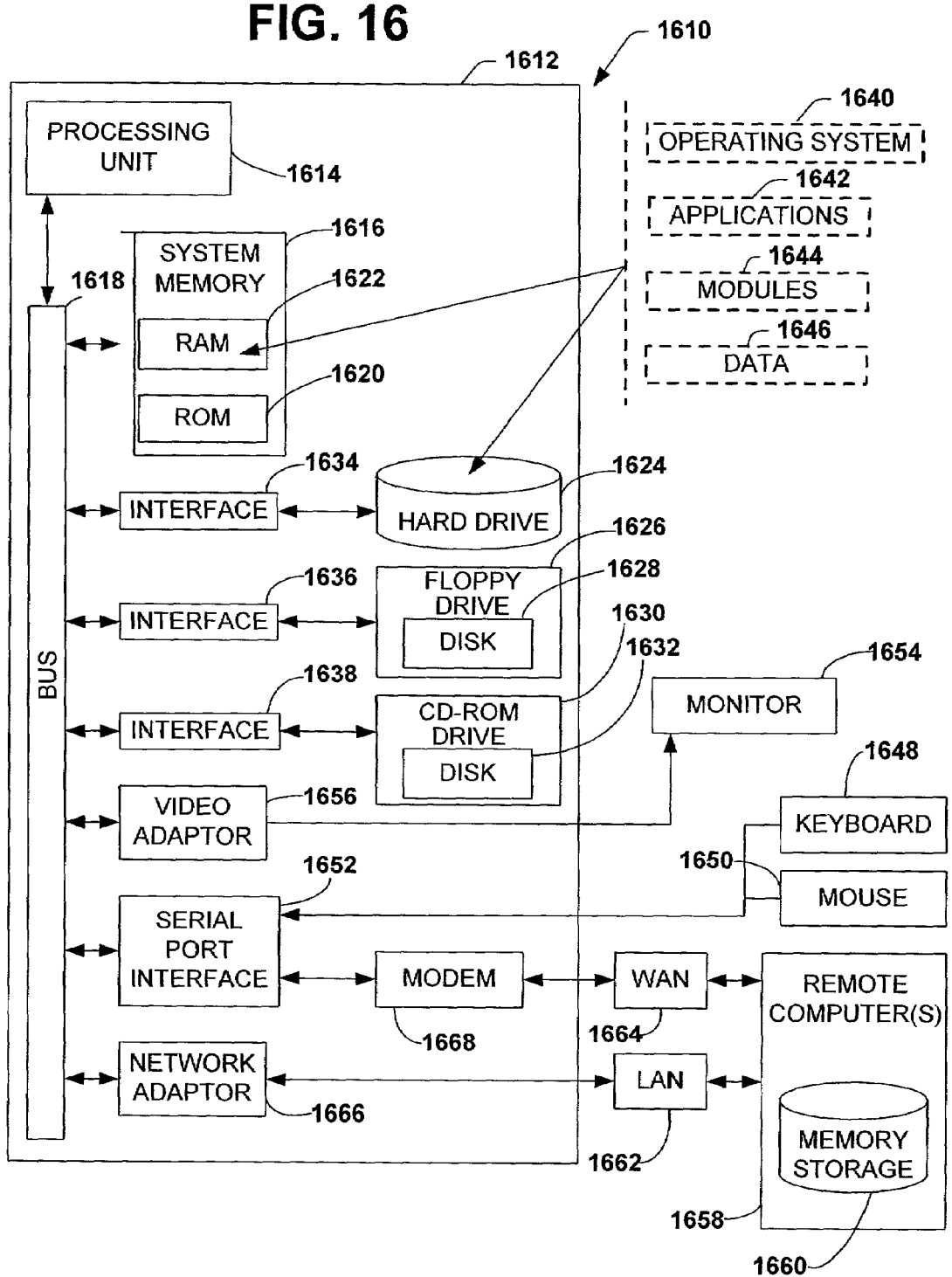
FIG. 16 is a schematic block diagram of an exemplary operating environment for a system configured in accordance with the present invention.

In order to provide additional context for various aspects of the present invention, FIG. 16 and the following discussion are intended to provide a brief, general description of one possible suitable computing environment 1610 in which the various aspects of the present invention may be implemented. It is to be appreciated that the computing environment 1610 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 16 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 16, an exemplary environment 1610 for implementing various aspects of the invention includes a computer 1612, including a processing unit 1614, a system memory 1616, and a system bus 1618 that couples various system components including the system memory to the processing unit 1614. The processing unit 1614 may be any of various commercially available processors. Dual microprocessors and other multi-processor architectures also can be used as the processing unit 1614.

The system bus 1618 may be any of several types of bus structure including a memory bus or memory controller, a peripheral bus, and a local bus using any of a variety of commercially available bus architectures. The computer memory 1616 includes read only memory (ROM) 1620 and random access memory (RAM) 1622. A basic input/output system (BIOS), containing the basic routines that help to transfer information between elements within the computer 1612, such as during start-up, is stored in ROM 1620.

The computer 1612 may further include a hard disk drive 1624, a magnetic disk drive 1626, e.g., to read from or write to a removable disk 1628, and an optical disk drive 1630, e.g., for reading a CD-ROM disk 1632 or to read from or write to other optical media. The hard disk drive 1624, magnetic disk drive 1626, and optical disk drive 1630 are connected to the system bus 1618 by a hard disk drive interface 1634, a magnetic disk drive interface 1636, and an optical drive interface 1638, respectively. The computer 1612 typically includes at least some form of computer readable media. Computer readable media can be any available media that can be accessed by the computer 1612. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1612. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1622, including an operating system 1640, one or more application programs 1642, other program modules 1644, and program non-interrupt data 1646. The operating system 1640 in the computer 1612 can be any of a number of commercially available operating systems.

A user may enter commands and information into the computer 1612 through a keyboard 1648 and a pointing device, such as a mouse 1650. Other input devices (not shown) may include a microphone, an IR remote control, a joystick, a game pad, a satellite dish, a scanner, or the like. These and other input devices are often connected to the processing unit 1614 through a serial port interface 1652 that is coupled to the system bus 1618, but may be connected by other interfaces, such as a parallel port, a game port, a universal serial bus ("USB"), an IR interface, etc. A monitor 1654, or other type of display device, is also connected to the system bus 1618 via an interface, such as a video adapter 1656. In addition to the monitor, a computer typically includes other peripheral output devices (not shown), such as speakers, printers etc.

The computer 1612 may operate in a networked environment using logical and/or physical connections to one or more remote computers, such as a remote computer(s) 1658. The remote computer(s) 1658 may be a workstation, a server computer, a router, a personal computer, microprocessor based entertainment appliance, a peer device or other common network node, and typically includes many or all of the elements described relative to the computer 1612, although, for purposes of brevity, only a memory storage device 1660 is illustrated. The logical connections depicted include a local area network (LAN) 1662 and a wide area network (WAN) 1664. Such networking environments are commonplace in offices, enterprise-wide computer networks, intranets and the Internet.

When used in a LAN networking environment, the computer 1612 is connected to the local network 1662 through a network interface or adapter 1666. When used in a WAN networking environment, the computer 1612 typically includes a modem 1668, or is connected to a communications server on the LAN, or has other means for establishing communications over the WAN 1664, such as the Internet. The modem 1668, which may be internal or external, is connected to the system bus 1618 via the serial port interface 1652. In a networked environment, program modules depicted relative to the computer 1612, or portions thereof, may be stored in the remote memory storage device 1660. It will be appreciated that the network connections shown are exemplary and other means of establishing a communications link between the computers may be used.

Figure 17:
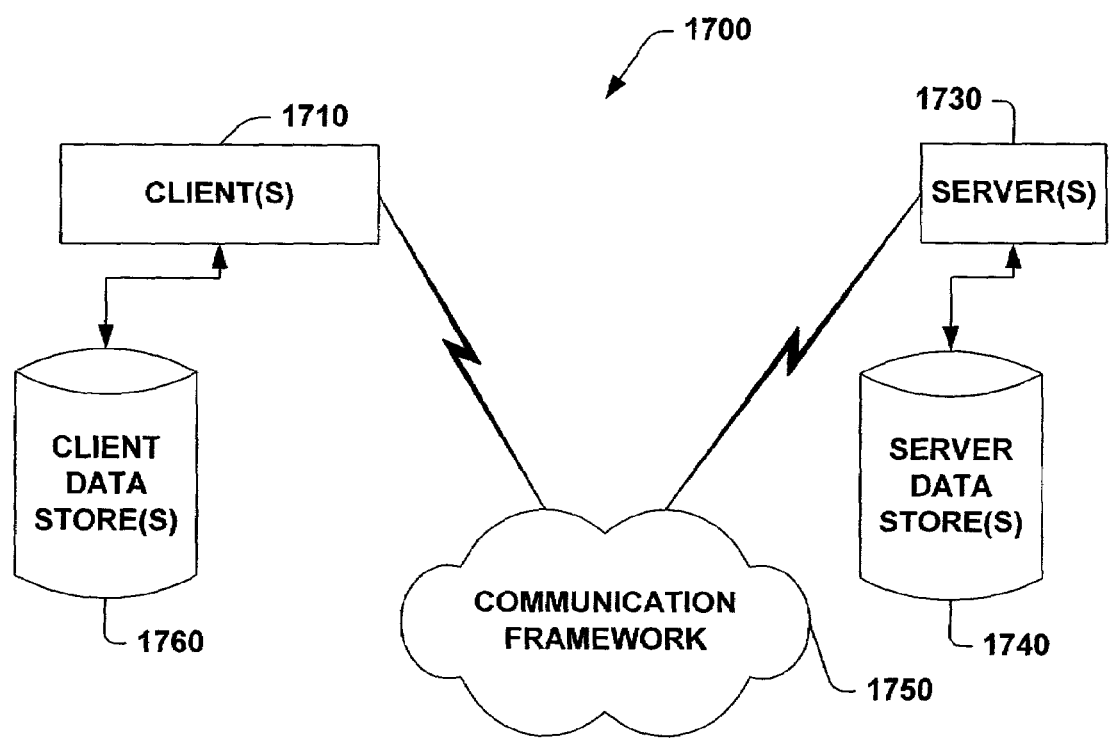
FIG. 17 is a schematic block diagram of an exemplary communication environment for a method performing in accordance with the present invention.

FIG. 17 is a schematic block diagram of a sample computing environment 1700 with which the present invention can interact. The system 1700 includes one or more client(s) 1710. The client(s) 1710 can be hardware and/or software (e.g., threads, processes, computing devices). The client(s) 1710 can house cookie(s) and/or associated contextual information by employing the present invention, for example. The system 1700 also includes one or more server(s) 1730. The server(s) 1730 can also be hardware and/or software (e.g., threads, processes, computing devices). The servers 1730 can house threads to perform transformations by employing the present invention, for example. One possible communication between a client 1700 and a server 1730 may be in the form of a data packet adapted to be transmitted between two or more computer processes. The data packet may include a cookie and/or associated contextual information, for example. The system 1700 includes a communication framework 1750 that can be employed to facilitate communications between the client(s) 1710 and the server(s) 1730. The client(s) 1710 are operably connected to one or more client data store(s) 1715 that can be employed to store information local to the client(s) 1710 (e.g., cookie(s) and/or associated contextual information). Similarly, the server(s) 1730 are operably connected to one or more server data store(s) 1740 that can be employed to store information local to the servers 1730.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A protocol diagnostic system, comprising:
a data stream monitor component that accesses raw network data and copies at least one protocol specific subset of the raw network data;
a diagnostics engine comprising at least one protocol state compressor that analyzes the at least one protocol specific subset of the raw network data, the protocol specific subset of raw network data being correlated with the protocol state compressor, the diagnostics engine determines condition of network connectivity, and the data stream monitor component utilizes at least one lexical rule set associated with the at least one protocol state compressor to determine subsets of the raw network data to copy, that at least one lexical rule set stores at least one of information regarding structure of subsets of the raw network data and protocol specific information, and
where the diagnostic engine, upon initialization, stores information associated with protocols to be monitored in that at least one lexical rule set, upon occurrence of a network connectivity problem, stores information associated with additional protocols, and upon correction of the network problem, deletes information associated with selected protocols from the at least one lexical rule set; and
an event correlator that receives results of analysis of the protocol state compressor, the event correlator correlates the results to detect a system problem.

2. The protocol diagnostic system of claim 1, the diagnostics engine further comprising at least one lexical rule set.

3. A method that facilitates network diagnostics, comprising:
accessing raw real-time network data and copying at least one subset of the raw real-time network data by a data stream monitor component;
selectively providing copied subset of the raw real-time network data to the protocol state compressors comprised in a diagnostics engine based at least in part upon lexical rule sets corresponding to the protocol state compressors, the lexical rule sets store at least one of information regarding structure of subsets of the raw real-time network data and protocol specific information;
storing and deleting information associated with protocols to be monitored in the lexical rules sets, where upon occurrence of a network connectivity problem, information associated with addition protocols is stored, and upon correction of the network problem, the information associated with the additional protocols is deleted from the lexical rule sets;
using the protocol state compressors to analyze the respective subset of the raw real-time network data;
diagnosing health status of a system based at least in part upon the analysis of the at least one of the protocol state compressors.

4. The method of claim 3, further comprising at least one of the following acts:
diagnosing a network connectivity problem based at least in part upon the analysis of at least one of the protocol state compressors; and
initiating corrective action associated with the network connectivity problem.

5. The method of claim 3, further comprising at least one of the following acts:
storing information associated with the health status of the system; and
providing information to a user regarding the health status of the system.

6. A computer network diagnostic system, comprising:
a data stream monitor or multiplex component that accesses real-time network data, selectively determines at least one subset of the real-time network data to multiplex based at least in part upon at least one lexical rule set; the lexical rule sets store at least one of information regarding structure of subsets of the raw real-time network data and protocol specific information;
a data stream distribution engine that demultiplexes the multiplexed data based at least in part upon the at least one lexical rule set; and
a diagnostic engine having a plurality of protocol state compressors, the protocol state compressors being associated with the at least one lexical rule set, the protocol state compressors analyzing their respective subsets of demultiplexed data received from the data stream distribution engine, the diagnostic engine further including an event correlator or inference engine that receives results of the analysis of the plurality of protocol state compressors, the event correlator or inference engine correlates the results to detect a system problem; and
wherein the diagnostic engine, upon occurrence of a network connectivity problem, stores information associated with additional protocols, and upon correction of the network problem, selectively deleted information associated with the additional protocols from the at least one lexical rule set.

7. The protocol diagnostic system of claim 6, the event correlator/inference engine diagnoses a potential source of the system problem.

8. The protocol diagnostic system of claim 6, the diagnostics engine further comprising the at least one lexical rule set.

9. The protocol diagnostic system of claim 7, the event correlator/inference engine initiates corrective action related to the system problem.

10. The protocol diagnostic system of claim 7, the event correlator/inference engine utilizing at least one of a neural network and an expert system to facilitate diagnosis of the potential source of the system problem.

11. A method that facilitates network diagnostic, comprising:
accessing at least one lexical rule set coinciding with a protocol to be monitored and copying raw data frames coinciding with the at one least lexical rule set by a data stream monitor component; wherein the lexical rule set stores at least one of information regarding structure of data frames and protocol specific information
multiplexing the copied raw data frames by the data stream monitor component;
demultiplexing the copied raw data frames based at least in part upon the at least one lexical rule set by a data stream distribution engine;
providing the copied raw data frames to a protocol state compressor comprised in a diagnostic engine;
using the protocol state compressor to analyze corresponding copied raw data frames utilizing at least in part the corresponding lexical rule set; and storing and deleting information associated with protocols to be monitored in the at least one lexical rule set, where upon occurrence of the network connectivity problem, information associated with addition protocols is stored, and upon correction of the network problem, the information associate with addition protocols is deleted from the at least one lexical rule set;

receiving correlating information at an event correlator from the protocol compressor to facilitate diagnosis of health status of a system.

12. The method of claim 11, further comprising at least one of the following acts:

determining whether an additional protocol to be monitored has been added; and adding a protocol state compressor and corresponding lexical rule set associated with the additional protocol.

13. The method of claim 11, further comprising at least one of the following acts:

initiating corrective action based at least in part upon the correlated information; and providing information to a user regarding the health status of network connectivity.

14. The method of claim 11, further comprising at least one of the following acts:

storing historical information regarding the health status of network connectivity;

determining potential sources of a problem associated with network connectivity;

accessing historical information regarding the health status of network connectivity;

calculating a probability of utility of one or more corrective actions based at least in part upon the potential sources of the problem and accessed historical information; and, consecutively initiating one or more corrective actions based at least in part upon the probability of utility.

15. A diagnostic engine for a server of a computer system, comprising:

a plain language notification data information store storing plain language notification information associated with a plurality of potential server problem;

a data stream monitor component that accesses raw network data and copies at least one protocol specific subset of the raw network data;

a protocol specific event information data store storing information associated with a server health status;

a diagnostic engine comprising at least one protocol state compressor that analyzes the at least one protocol specific subset of the raw network data, the protocol specific subset of raw network data being correlated with the protocol state compressor, the diagnostics engine determines condition of network connectivity and the data stream monitor component utilizes at least one lexical rule set that stores information regarding structure of the at least one protocol specific subset of the raw network data and protocol specific information, where upon occurrence of a network connectivity problem, information associated with additional protocols is stored, and upon correction of the network problem, information associated with the additional protocols is deleted from the at least one lexical rule set; and a self healing component that analyzes information stored in the protocol specific event information to determine at least one of appropriate corrective action and appropriate plain language notification, the plain language notification based at least in part upon information stored in the plain language notification data store.

16. A computer storage readable medium having computer usable components for protocol diagnostics engine, comprising:

a data stream monitor or multiplex component that access real-time network data, selectively determines at least one subset of the real-time network data to multiplex based at least in part upon the at least in part upon the at least one lexical rule set; the lexical rule sets store at least one of information regarding structure of subsets of the raw real-time network data and protocol specific information;

a data stream distribution engine that demultiplexes the multiplexed data based at least in part upon the at least one lexical rule set; and a diagnostics engine having at least one protocol state compressor, the protocol state compressor being associated with at least one lexical rule set, the protocol state compressor analyzing respective subsets of demultiplexed data received from the data stream distribution engine, where the diagnostic engine, upon initialization, stores information associated with protocols to be monitored in the at least one lexical rule set, the diagnostic engine, upon occurrence of a network connectivity problem, stores information associated with additional protocols, and upon correction of the network problem, deletes information associated with selected protocols from the at least one lexical rule set; and An event correlator inference engine that receives results of the analysis of the protocol state compressor, the event correlator or inference engine correlates the results to detect a system problem.

* * * * *